United States Patent
Lee et al.

(10) Patent No.: US 11,546,033 B2
(45) Date of Patent: Jan. 3, 2023

(54) METHOD OF PERFORMING BEAM TRAINING BASED ON REINFORCEMENT LEARNING AND WIRELESS COMMUNICATION DEVICE PERFORMING THE SAME

(71) Applicant: Samsung Electronics Co., Ltd., Suwon-si (KR)

(72) Inventors: Junho Lee, Hwaseong-si (KR); Jaein Kim, Seoul (KR); Jonggun Moon, Seongnam-si (KR); Hyukyeon Lee, Hwaseong-si (KR); Seungjin Choi, Suwon-si (KR); Huiwon Je, Osan-si (KR); Jinwon Choi, Seongnam-si (KR)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 0 days.

(21) Appl. No.: 17/539,759

(22) Filed: Dec. 1, 2021

(65) Prior Publication Data
US 2022/0368393 A1     Nov. 17, 2022

(30) Foreign Application Priority Data
Apr. 30, 2021   (KR) .................. 10-2021-0056571

(51) Int. Cl.
*H04B 7/06*     (2006.01)

(52) U.S. Cl.
CPC ......... *H04B 7/0617* (2013.01); *H04B 7/0634* (2013.01); *H04B 7/0695* (2013.01)

(58) Field of Classification Search
CPC .. H04B 7/0617; H04B 7/0695; H04B 7/0634; H04W 16/28; H04W 24/08
USPC .......................................................... 375/267
See application file for complete search history.

(56) References Cited

U.S. PATENT DOCUMENTS

| | | |
|---|---|---|
| 8,280,445 B2 | 10/2012 | Yong et al. |
| 8,730,873 B2 | 5/2014 | Nikula et al. |
| 10,164,692 B2 | 12/2018 | Jung et al. |
| 10,327,155 B2 | 6/2019 | Zhao et al. |
| 10,505,616 B1 | 12/2019 | Chen et al. |
| 10,608,726 B2 | 3/2020 | Lou et al. |
| 10,784,950 B2 | 9/2020 | Kang et al. |
| 2019/0147355 A1 | 5/2019 | Rennie et al. |

(Continued)

FOREIGN PATENT DOCUMENTS

| | | |
|---|---|---|
| KR | 10-2067114 B1 | 1/2020 |
| KR | 10-2020-0030827 A | 3/2020 |
| KR | 10-2156286 B1 | 9/2020 |

*Primary Examiner* — Leila Malek
(74) *Attorney, Agent, or Firm* — Harness, Dickey & Pierce, P.L.C.

(57) ABSTRACT

A method of performing beam training including obtaining at least one of a probability distribution and a value function for selecting one of a plurality of beams that are used to perform beamforming, selecting a candidate beam from among the plurality of beams based on the at least one of the probability distribution and the value function, the candidate beam being expected to be a best beam among the plurality of beams, performing a present training operation based on the candidate beam and a previous beam selected by at least one previous training operation, and selecting a better one of the candidate beam and the previous beam as a present beam based on a result of the present training operation may be provided.

20 Claims, 18 Drawing Sheets

(56) References Cited

U.S. PATENT DOCUMENTS

| | | | |
|---|---|---|---|
| 2019/0372644 A1* | 12/2019 | Chen | G06N 3/126 |
| 2020/0287604 A1 | 9/2020 | Gao et al. | |
| 2020/0295817 A1 | 9/2020 | Loghin et al. | |
| 2020/0382197 A1 | 12/2020 | Kang et al. | |
| 2021/0336687 A1* | 10/2021 | Pezeshki | G06N 3/08 |

* cited by examiner

FIG. 10

| TRAINING PHASE INDEX | 1 | 2 | 3 | 4 | 5 | 6 | 7 | 8 | 9 | 10 | 11 | 12 | 13 | 14 | 15 | 16 | 17 | 18 | 19 | 20 |
|---|---|---|---|---|---|---|---|---|---|---|---|---|---|---|---|---|---|---|---|---|
| OPTIMAL BEAM INDEX | 2 | 2 | 2 | 2 | 2 | 2 | 2 | 2 | 2 | 4 | 4 | 4 | 4 | 4 | 4 | 4 | 4 | 4 | 4 | 4 |
| FIXED TRAINING SEQUENCE | 2 | 2 | 2 | 2 | 2 | 2 | 2 | 2 | 2 | 2 | 1 | 3 | 3 | 3 | 4 | 4 | 4 | 4 | 4 | 4 |
| SELECTED BEAM INDEX | 2 | 2 | 2 | 2 | 2 | 2 | 2 | 2 | 2 | 2 | 1 | 3 | 3 | 3 | 4 | 4 | 4 | 4 | 4 | 4 |
| ADAPTIVE TRAINING SEQUENCE | 2 | 2 | 2 | 2 | 2 | 2 | 2 | 2 | 2 | 2 | 3 | 3 | 4 | 4 | 4 | 4 | 4 | 4 | 4 | 4 |
| SELECTED BEAM INDEX | 2 | 2 | 2 | 2 | 2 | 2 | 2 | 2 | 2 | 3 | 3 | 4 | 4 | 4 | 4 | 4 | 4 | 4 | 4 | 4 |

FIG. 11A

| | | \multicolumn{7}{c}{BEAM INDEX} |
|---|---|---|---|---|---|---|---|---|
| | PROBABILITY | 1 | 2 | 3 | 4 | 5 | 6 | 7 |
| | 1 | 0.1963 | 0.19626 | 0.19626 | 0.1028 | 0.1028 | 0.1028 | 0.1028 |
| | 1 | 0.1911 | 0.19106 | 0.19106 | 0.1067 | 0.1067 | 0.1067 | 0.1067 |
| | 2 | 0.2369 | 0.23692 | 0.23692 | 0.07231 | 0.07231 | 0.07231 | 0.07231 |
| | 2 | 0.2289 | 0.22888 | 0.22888 | 0.07834 | 0.07834 | 0.07834 | 0.07834 |
| | 3 | 0.2652 | 0.26525 | 0.26525 | 0.05107 | 0.05107 | 0.05107 | 0.05107 |
| | 3 | 0.2567 | 0.25675 | 0.25675 | 0.05744 | 0.05744 | 0.05744 | 0.05744 |
| | 4 | 0.2846 | 0.28456 | 0.28456 | 0.03658 | 0.03658 | 0.03658 | 0.03658 |
| | 4 | 0.2769 | 0.27686 | 0.27686 | 0.04236 | 0.04236 | 0.04236 | 0.04236 |
| | 5 | 0.2978 | 0.29782 | 0.29782 | 0.02663 | 0.02663 | 0.02663 | 0.02663 |
| | 5 | 0.2913 | 0.29134 | 0.29134 | 0.03149 | 0.03149 | 0.03149 | 0.03149 |
| | 6 | 0.3071 | 0.30706 | 0.30706 | 0.0197 | 0.0197 | 0.0197 | 0.0197 |
| | 6 | 0.3018 | 0.30184 | 0.30184 | 0.02362 | 0.02362 | 0.02362 | 0.02362 |
| | 7 | 0.3136 | 0.3136 | 0.3136 | 0.0148 | 0.0148 | 0.0148 | 0.0148 |
| | 7 | 0.3095 | 0.30949 | 0.30949 | 0.01788 | 0.01788 | 0.01788 | 0.01788 |
| | 8 | 0.3183 | 0.3183 | 0.3183 | 0.01128 | 0.01128 | 0.01128 | 0.01128 |
| | 8 | 0.3151 | 0.3151 | 0.3151 | 0.01367 | 0.01367 | 0.01367 | 0.01367 |
| | 9 | 0.3217 | 0.3217 | 0.3217 | 0.00872 | 0.00872 | 0.00872 | 0.00872 |
| | 9 | 0.3192 | 0.31925 | 0.31925 | 0.01056 | 0.01056 | 0.01056 | 0.01056 |
| TRAINING | 10 | 0.3242 | 0.3242 | 0.3242 | 0.00685 | 0.00685 | 0.00685 | 0.00685 |
| PHASE | 10 | 0.3223 | 0.32232 | 0.32232 | 0.00826 | 0.00826 | 0.00826 | 0.00826 |
| INDEX | 11 | 0.18 | 0.38661 | 0.38661 | 0.0281 | 0.00623 | 0.00623 | 0.00623 |
| | 11 | 0.2091 | 0.36622 | 0.36622 | 0.03555 | 0.00764 | 0.00764 | 0.00764 |
| | 12 | 0.1206 | 0.40634 | 0.40634 | 0.05026 | 0.00548 | 0.00548 | 0.00548 |
| | 12 | 0.1491 | 0.38299 | 0.38299 | 0.06453 | 0.00679 | 0.00679 | 0.00679 |
| | 13 | 0.1102 | 0.22632 | 0.52054 | 0.09908 | 0.03242 | 0.00573 | 0.00573 |
| | 13 | 0.1401 | 0.26505 | 0.41072 | 0.12684 | 0.04278 | 0.00724 | 0.00724 |
| | 14 | 0.0944 | 0.16157 | 0.50444 | 0.16419 | 0.06408 | 0.00564 | 0.00564 |
| | 14 | 0.1176 | 0.19274 | 0.3992 | 0.19551 | 0.08107 | 0.00696 | 0.00696 |
| | 15 | 0.0758 | 0.11757 | 0.46143 | 0.2318 | 0.10305 | 0.0052 | 0.0052 |
| | 15 | 0.0918 | 0.13911 | 0.38121 | 0.25246 | 0.12301 | 0.00619 | 0.00619 |
| | 16 | 0.0577 | 0.08451 | 0.42196 | 0.28314 | 0.14367 | 0.00454 | 0.00454 |
| | 16 | 0.0694 | 0.10035 | 0.36542 | 0.28973 | 0.16451 | 0.00529 | 0.00529 |
| | 17 | 0.043 | 0.06075 | 0.39252 | 0.31342 | 0.18261 | 0.00387 | 0.00387 |
| | 17 | 0.0519 | 0.07282 | 0.35338 | 0.31012 | 0.20285 | 0.00446 | 0.00446 |
| | 18 | 0.0319 | 0.04403 | 0.37188 | 0.32763 | 0.21794 | 0.00331 | 0.00331 |
| | 18 | 0.0388 | 0.05328 | 0.34458 | 0.31984 | 0.236 | 0.00376 | 0.00376 |
| | 19 | 0.0238 | 0.03225 | 0.35752 | 0.33259 | 0.24812 | 0.00285 | 0.00285 |
| | 19 | 0.0291 | 0.03931 | 0.33836 | 0.32402 | 0.26284 | 0.00321 | 0.00321 |
| | 20 | 0.0179 | 0.02388 | 0.34761 | 0.33331 | 0.2723 | 0.0025 | 0.0025 |
| | 20 | 0.0219 | 0.02926 | 0.33422 | 0.32575 | 0.28331 | 0.00277 | 0.00277 |

FIG. 13
(RELATED ART)

|  | TRAIL#0 | TRAIL#1 | TRAIL#2 | TRAIL#3 | TRAIL#4 | TRAIL#5 | TRAIL#6 |
|---|---|---|---|---|---|---|---|
| BESTBEAM#0 | BEAM#0 | BEAM#1 | BEAM#2 | BEAM#3 | BEAM#4 | BEAM#5 | BEAM#6 |
| BESTBEAM#1 | BEAM#1 | BEAM#2 | BEAM#3 | BEAM#4 | BEAM#5 | BEAM#6 | BEAM#0 |
| BESTBEAM#2 | BEAM#2 | BEAM#3 | BEAM#4 | BEAM#5 | BEAM#6 | BEAM#0 | BEAM#1 |
| BESTBEAM#3 | BEAM#3 | BEAM#4 | BEAM#5 | BEAM#6 | BEAM#0 | BEAM#1 | BEAM#2 |
| BESTBEAM#4 | BEAM#4 | BEAM#5 | BEAM#6 | BEAM#0 | BEAM#1 | BEAM#2 | BEAM#3 |
| BESTBEAM#5 | BEAM#5 | BEAM#6 | BEAM#0 | BEAM#1 | BEAM#2 | BEAM#3 | BEAM#4 |
| BESTBEAM#6 | BEAM#6 | BEAM#0 | BEAM#1 | BEAM#2 | BEAM#3 | BEAM#4 | BEAM#5 |

FIG. 14

| | TRAIL#0 | EXPLOITATION TRAIL#1 | EXPLOITATION TRAIL#2 | EXPLORATION TRAIL#3 | EXPLOITATION TRAIL#4 | EXPLOITATION TRAIL#5 | EXPLORATION TRAIL#6 | EXPLOITATION TRAIL#7 | EXPLOITATION TRAIL#8 | EXPLORATION TRAIL#9 | EXPLOITATION TRAIL#10 | EXPLOITATION TRAIL#11 | EXPLORATION TRAIL#12 |
|---|---|---|---|---|---|---|---|---|---|---|---|---|---|
| BESTBEAM#0 | BEAM#0 | BEAM#6 | BEAM#1 | BEAM#2 | BEAM#6 | BEAM#1 | BEAM#3 | BEAM#6 | BEAM#1 | BEAM#4 | BEAM#6 | BEAM#1 | BEAM#5 |
| BESTBEAM#1 | BEAM#1 | BEAM#0 | BEAM#2 | BEAM#3 | BEAM#0 | BEAM#2 | BEAM#4 | BEAM#0 | BEAM#2 | BEAM#5 | BEAM#0 | BEAM#2 | BEAM#6 |
| BESTBEAM#2 | BEAM#2 | BEAM#1 | BEAM#3 | BEAM#4 | BEAM#1 | BEAM#3 | BEAM#5 | BEAM#1 | BEAM#3 | BEAM#6 | BEAM#1 | BEAM#3 | BEAM#0 |
| BESTBEAM#3 | BEAM#3 | BEAM#2 | BEAM#4 | BEAM#5 | BEAM#2 | BEAM#4 | BEAM#6 | BEAM#2 | BEAM#4 | BEAM#0 | BEAM#2 | BEAM#4 | BEAM#1 |
| BESTBEAM#4 | BEAM#4 | BEAM#3 | BEAM#5 | BEAM#6 | BEAM#3 | BEAM#5 | BEAM#0 | BEAM#3 | BEAM#5 | BEAM#1 | BEAM#3 | BEAM#5 | BEAM#2 |
| BESTBEAM#5 | BEAM#5 | BEAM#4 | BEAM#6 | BEAM#0 | BEAM#4 | BEAM#6 | BEAM#1 | BEAM#4 | BEAM#6 | BEAM#2 | BEAM#4 | BEAM#6 | BEAM#3 |
| BESTBEAM#6 | BEAM#6 | BEAM#5 | BEAM#0 | BEAM#1 | BEAM#5 | BEAM#0 | BEAM#2 | BEAM#5 | BEAM#0 | BEAM#3 | BEAM#5 | BEAM#0 | BEAM#4 |

FIG. 15A

| BESTBEAM | EXPLOITATION TRAIL#0 | EXPLOITATION TRAIL#1 | EXPLORATION TRAIL#2 | EXPLOITATION TRAIL#3 | EXPLOITATION TRAIL#4 | EXPLORATION TRAIL#5 | EXPLOITATION TRAIL#6 | EXPLOITATION TRAIL#7 | EXPLORATION TRAIL#8 | EXPLOITATION TRAIL#9 | EXPLOITATION TRAIL#10 | EXPLORATION TRAIL#11 | EXPLOITATION TRAIL#12 |
|---|---|---|---|---|---|---|---|---|---|---|---|---|---|
| BESTBEAM#0 | BEAM#0 | BEAM#6 |  | BEAM#6 | BEAM#1 |  | BEAM#6 | BEAM#1 |  | BEAM#6 | BEAM#1 |  | BEAM#6 |
| BESTBEAM#1 | BEAM#1 | BEAM#0 |  | BEAM#0 | BEAM#2 |  | BEAM#0 | BEAM#2 |  | BEAM#0 | BEAM#2 |  | BEAM#0 |
| BESTBEAM#2 | BEAM#2 | BEAM#1 |  | BEAM#1 | BEAM#3 |  | BEAM#1 | BEAM#3 |  | BEAM#1 | BEAM#3 |  | BEAM#1 |
| BESTBEAM#3 | BEAM#3 | BEAM#2 | BEAM#A | BEAM#2 | BEAM#4 | BEAM#B | BEAM#2 | BEAM#4 | BEAM#C | BEAM#2 | BEAM#4 | BEAM#D | BEAM#2 |
| BESTBEAM#4 | BEAM#4 | BEAM#3 |  | BEAM#3 | BEAM#5 |  | BEAM#3 | BEAM#5 |  | BEAM#3 | BEAM#5 |  | BEAM#3 |
| BESTBEAM#5 | BEAM#5 | BEAM#4 |  | BEAM#4 | BEAM#6 |  | BEAM#4 | BEAM#6 |  | BEAM#4 | BEAM#6 |  | BEAM#4 |
| BESTBEAM#6 | BEAM#6 | BEAM#5 |  | BEAM#5 | BEAM#0 |  | BEAM#5 | BEAM#0 |  | BEAM#5 | BEAM#0 |  | BEAM#5 |

FIG. 15B

|  | TRAIL#3 | TRAIL#6 | TRAIL#9 | TRAIL#12 |
|---|---|---|---|---|
| BESTBEAM#0 | BEAM#6 | BEAM#5 | BEAM#4 | BEAM#3 |
| BESTBEAM#1 | BEAM#0 | BEAM#6 | BEAM#5 | BEAM#4 |
| BESTBEAM#2 | BEAM#1 | BEAM#0 | BEAM#6 | BEAM#5 |
| BESTBEAM#3 | BEAM#2 | BEAM#1 | BEAM#0 | BEAM#6 |
| BESTBEAM#4 | BEAM#3 | BEAM#2 | BEAM#1 | BEAM#0 |
| BESTBEAM#5 | BEAM#4 | BEAM#3 | BEAM#2 | BEAM#1 |
| BESTBEAM#6 | BEAM#5 | BEAM#4 | BEAM#3 | BEAM#2 |

FIG. 15C

|  | TRAIL#3 | TRAIL#6 | TRAIL#9 | TRAIL#12 |
|---|---|---|---|---|
| BESTBEAM#0 | BEAM#1 | BEAM#2 | BEAM#3 | BEAM#4 |
| BESTBEAM#1 | BEAM#2 | BEAM#3 | BEAM#4 | BEAM#5 |
| BESTBEAM#2 | BEAM#3 | BEAM#4 | BEAM#5 | BEAM#6 |
| BESTBEAM#3 | BEAM#4 | BEAM#5 | BEAM#6 | BEAM#0 |
| BESTBEAM#4 | BEAM#5 | BEAM#6 | BEAM#0 | BEAM#1 |
| BESTBEAM#5 | BEAM#6 | BEAM#0 | BEAM#1 | BEAM#2 |
| BESTBEAM#6 | BEAM#0 | BEAM#1 | BEAM#2 | BEAM#3 |

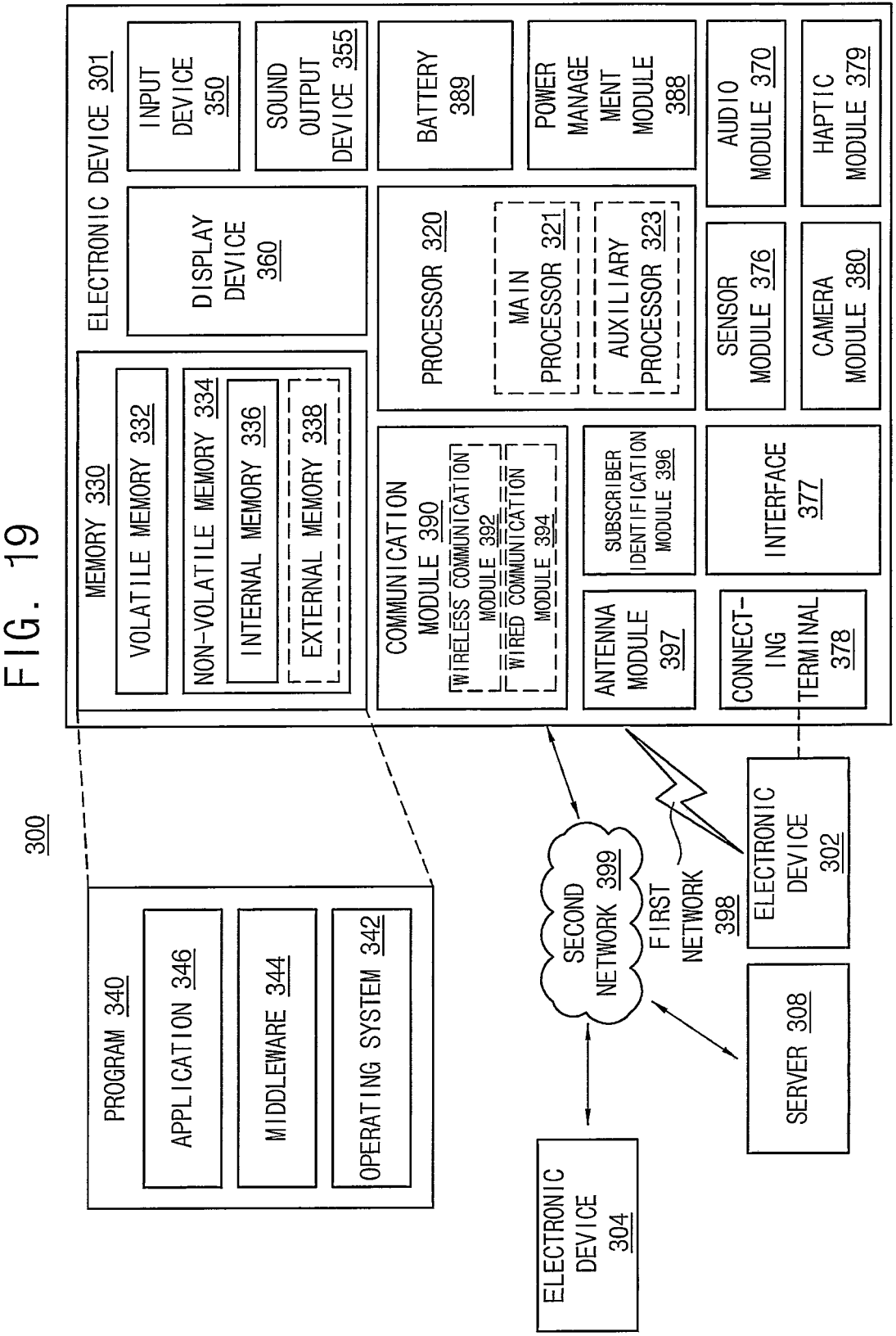

METHOD OF PERFORMING BEAM TRAINING BASED ON REINFORCEMENT LEARNING AND WIRELESS COMMUNICATION DEVICE PERFORMING THE SAME

CROSS-REFERENCE TO RELATED APPLICATION

This application claims priority under 35 USC § 119 to Korean Patent Application No. 10-2021-0056571 filed on Apr. 30, 2021 in the Korean Intellectual Property Office (KIPO), the contents of which are herein incorporated by reference in their entirety.

BACKGROUND

1. Technical Field

Example embodiments relate generally to semiconductor integrated circuits, and more particularly to methods of performing beam training based on reinforcement learning for beamforming, and wireless communication devices performing the methods.

2. Description of the Related Art

Recent proposals for a fifth-generation (5G) communication system (5G radio access technology) aim to improve performance of the commercially widespread long-term evolution (LTE) and LTE advanced (LTE-A), by providing an ultrahigh-speed data service of several Gbps using an ultra-wideband bandwidth of 100 MHz or more. Considering the technical challenge of achieving ultra-wideband communication over frequency bands of several hundred MHz or several GHz, which are used in LTE and LTE-A, frequencies of 6 GHz or more are being considered in the 5G communication system. For example, a technique of increasing a transmission rate using a millimeter (mm) wave band is being considered for 5G, with potential bands including the 28 GHz band (26.5-29.5 GHz) and the 60 GHz band (57-71 GHz). However, since the path loss of radio waves is proportional to frequency, relatively high path loss that occurs with mm waves may reduce the service area for communication with a given base station.

In an effort to reduce or prevent such service area reduction, a beamforming technique for increasing a range of the radio waves by generating directional beams using a plurality of antennas has been proposed for a 5G communication system. The beamforming technique may be applied to each of a transmitter (e.g., a base station) and a receiver (e.g., a terminal). The beamforming technique may not only expand the service area but also reduce interference due to the focusing of physical beams toward a target.

In a 5G communication system, a pointing direction of transmission beams of the transmission device should be aligned with a pointing direction of receiving beams of the receiving device to optimize the beneficial effect of the beamforming technique. Accordingly, research has been conducted into beamforming techniques that form such optimally pointing beams. For example, beam training may be performed to align beams of a transmitter and a receiver and may be repeated due to a variable wireless communication environment, and the quality of wireless communication may depend on the accuracy and efficiency of beam training.

SUMMARY

Some example embodiments of the present disclosure provide methods of efficiently performing beam training based on reinforcement learning for beamforming in wireless communication.

Some example embodiments of the present disclosure provide a wireless communication device performing the method.

According to some example embodiments, a method of performing beam training may include obtaining at least one of a probability distribution and a value function for selecting one of a plurality of beams that are used to perform beamforming, selecting a candidate beam from among the plurality of beams based on the at least one of the probability distribution and the value function, the candidate beam being expected to be a best beam among the plurality of beams, performing a present training operation based on the candidate beam and a previous beam selected by at least one previous training operation, and selecting a better one of the candidate beam and the previous beam as a present beam based on a result of the present training operation.

According to some example embodiments, a wireless communication device may include a plurality of antenna arrays, a plurality of radio frequency (RF) chains connected to the plurality of antenna arrays, and a signal processor processes signals received from the plurality of antenna arrays. The signal processor may be configured to cause the wireless communication device to obtain at least one of a probability distribution and a value function for selecting one of a plurality of beams that are used to perform beamforming, select a candidate beam from among the plurality of beams based on the at least one of the probability distribution and the value function, the candidate beam being expected to be a best beam among the plurality of beams, perform a present training operation based on the candidate beam and a previous beam selected by at least one previous training operation, and select a better one of the candidate beam and the previous beam as a present beam based on a result of the present training operation.

According to some example embodiments, a method of performing beam training may include defining at least one of a probability distribution and a value function for selecting one of a plurality of beams that are used to perform beamforming, selecting a first candidate beam from among the plurality of beams based on the at least one of the probability distribution and the value function, the first candidate beam being expected to be a first best beam among the plurality of beams in a first training phase, performing a first training operation in the first training phase based on the first candidate beam and a first present beam, selecting a second present beam based on a result of the first training operation, updating the at least one of the probability distribution and the value function based on the result of the first training operation, selecting a second candidate beam from among the plurality of beams based on the at least one of the updated probability distribution and the updated value function, the second candidate beam being expected to be a second best beam among the plurality of beams in a second training phase subsequent to the first training phase, performing a second training operation in the second training phase based on the second candidate beam and the second present beam, selecting a third present beam based on a result of the second training operation, and updating the at least one of the probability distribution and the value function based on the result of the second training operation. A training sequence that represents an order of selecting the first candidate beam and the second candidate beam may not be fixed and may be adaptively changed.

In the method of performing beam training and the wireless communication device according to some example embodiments, a reinforcement learning-based beam training operation may be performed for efficient beam training under a variable channel. For example, an efficient online reinforcement learning-based framework may be implemented such that more training operations are selectively performed on more promising beams (or more likely beams), an optimal searching may be performed gradually, and an adaptive (or variable) training sequence may be formed instead of a fixed training sequence. Accordingly, the beam tracking may be efficiently performed, the training overhead depending on a change of beams may be reduced, the best beam may be detected or searched rapidly or quickly within a limited training sequence, and communication performance may be improved or enhanced.

BRIEF DESCRIPTION OF THE DRAWINGS

Illustrative, non-limiting example embodiments will be more clearly understood from the following detailed description taken in conjunction with the accompanying drawings.

FIGS. 10, 11A, 11B and 12 are diagrams for describing a method of performing beam training of FIG. 6.

FIG. 13 illustrates an example of a fixed training sequence in the conventional beam training scheme.

FIGS. 14, 15A, 15B and 15C illustrate examples of an adaptive training sequence in the beam training scheme according to some example embodiments.

FIG. 19 is a block diagram illustrating an electronic device in a network environment according to some example embodiments.

DETAILED DESCRIPTION

Figure 1:
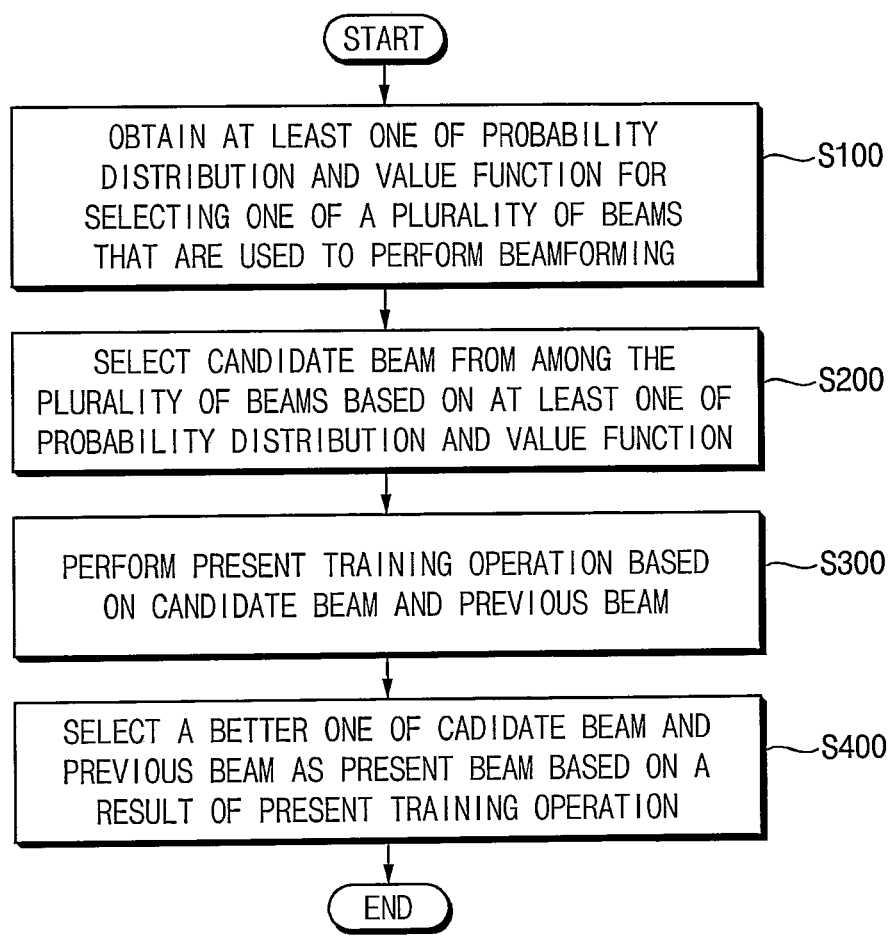
FIG. 1 is a flowchart illustrating a method of performing beam training according to some example embodiments.

Various example embodiments will be described more fully with reference to the accompanying drawings, in which some example embodiments are shown. The present disclosure may, however, be embodied in many different forms and should not be construed as limited to the example embodiments set forth herein. Like reference numerals refer to like elements throughout this application.

FIG. 1 is a flowchart illustrating a method of performing beam training according to some example embodiments.

Referring to FIG. 1, a method of performing beam training according to an example embodiments is implemented based on reinforcement learning. For example, the reinforcement learning may include multi-armed bandit (MAB) learning. In addition, the method of performing beam training according to some example embodiments may be performed by a wireless communication device and a wireless communication system including the wireless communication device. For example, the wireless communication system may include a transmitter and a receiver each of which includes a multi-antenna array, and may be a millimeter wave (mmWave) band communication system using training-based analog beamforming. Detailed configurations of the wireless communication device and the wireless communication system will be described with reference to FIG. 2, and the reinforcement learning will be described with reference to FIGS. 4 and 5.

In the method of performing beam training according to some example embodiments, at least one of a probability distribution and a value function for selecting one of a plurality of beams that are used to perform beamforming is obtained (step S100). For example, in step S100, the at least one of the probability distribution and the value function may be defined, set and/or updated.

A candidate beam (or selection beam) is selected from among the plurality of beams based on the at least one of the probability distribution and the value function (step S200). The candidate beam is a beam that is expected to be the best beam (or an optimal beam or the most promising beam) among the plurality of beams. As will be described with reference to FIG. 5, an online (or real-time) reinforcement learning-based framework may be performed in selecting the candidate beam.

In some example embodiments, as will be described with reference to FIG. 6, when the candidate beam is selected using an adversarial bandit model based on an exponential-weight algorithm for exploration and exploitation (EXP3), it may be implemented to select the candidate beam based on the probability distribution.

In other example embodiments, as will be described with reference to FIG. 16, when the candidate beam is selected using a statistical bandit model based on an upper confidence bound (UCB) algorithm, it may be implemented to select the candidate beam based on the value function (e.g., based on an upper confidence bound index corresponding to the value function).

A present training operation is performed based on the candidate beam and a previous beam selected by at least one previous training operation (step S300). For example, the present training operation may be performed by transmitting and/or receiving known symbols multiple times based on the candidate beam and the previous beam. Step S300 will be described with reference to FIG. 8.

A present beam is selected to correspond to the best beam based on a result of the present training operation (step S400). For example, a better one of the candidate beam and the previous beam may be selected as the present beam based on (e.g., by comparing) quality (or characteristic) of signals received based on the candidate beam and the previous beam. Step S400 will be described with reference to FIG. 9. Thus, a signal and power for a wireless communication may be transmitted based on the selected better beam.

Although FIG. 1 illustrates that steps S100, S200, S300 and S400 are performed once and finished, example embodiments are not limited thereto. For example, as will be described with reference to FIGS. 6 and 16, steps S100, S200, S300 and S400 may be repeatedly performed. For example, as will be described with reference to FIG. 5, an operation in which steps S100, S200, S300 and S400 are performed once may be defined as one training phase (or training period or training interval). In each training phase, one candidate beam may be selected and the training operation may be performed. When the training phases are repeatedly and continuously performed, an order in which the candidate beams are selected may be defined as a training sequence.

In the method of performing beam training according to some example embodiments, a reinforcement learning-based beam training operation may be performed for efficient beam training under a variable channel. For example, an efficient online reinforcement learning-based framework may be implemented such that more training operations are selectively performed on more promising beams (or more likely beams), an optimal searching may be performed gradually, and an adaptive (or variable) training sequence may be formed instead of a fixed training sequence. Accordingly, the beam tracking may be efficiently performed, the training overhead depending on a change of beams may be reduced, the best beam may be detected or searched rapidly or quickly within a limited training sequence, and communication performance may be improved or enhanced.

Figure 2:
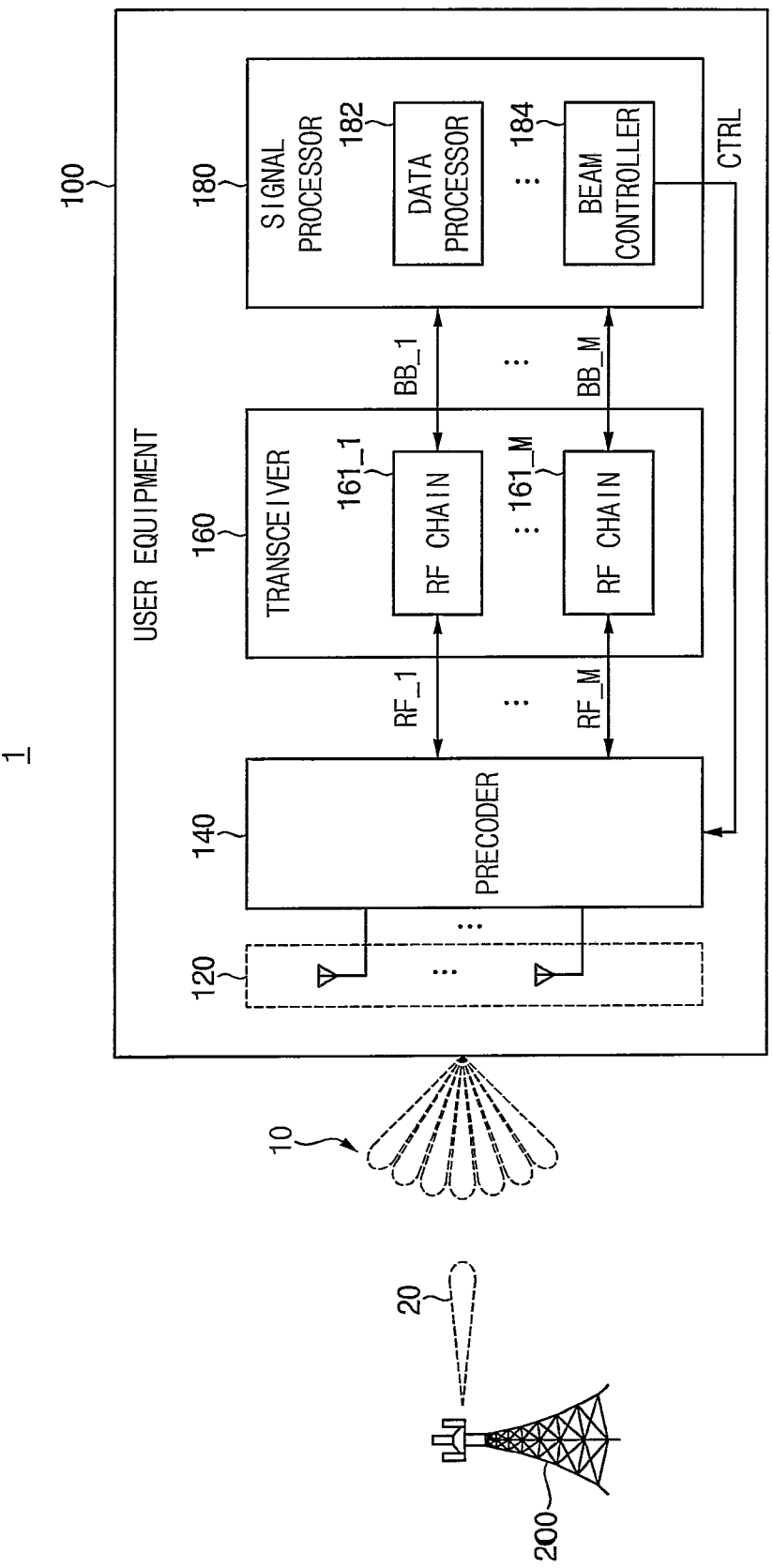
FIG. 2 is a block diagram illustrating a wireless communication device and a wireless communication system according to some example embodiments.

FIG. 2 is a block diagram illustrating a wireless communication device and a wireless communication system according to some example embodiments.

Referring to FIG. 2, a wireless communication system 1 may include a user equipment (UE) 100 and a base station (BS) 200.

In some example embodiments, the wireless communication system 1 may include a wireless communication system using a cellular network, such as a fifth generation wireless (5G) system, a long term evolution (LTE) system, an LTE-advanced system, a code division multiple access (CDMA) system, and/or a global system for mobile communications (GSM) system, or the like. In other example embodiments, the wireless communication system 1 may include a wireless local area network (WLAN) system, a wireless personal area network (WPAN) system, and/or other arbitrary wireless communication systems. Hereinafter, the wireless communication system 1 will be described based on the wireless communication system using the cellular network, however, example embodiments are not limited thereto.

The user equipment 100 may be stationary or mobile as a wireless communication device, and may refer to an arbitrary device that transmits and receives data and/or control information to and from the base station 200 through wireless communication. For example, the user equipment 100 may be referred to as a terminal, a terminal equipment, a mobile station (MS), a mobile terminal (MT), a user terminal (UT), a subscriber station (SS), a wireless device, and/or a portable device. For example, the user equipment 100 may include a plurality of antennas 120, a precoder 140, a transceiver 160 and a signal processor 180.

The base station 200 may generally refer to a fixed station that communicates with the user equipment 100 and/or another base station, and may exchange data and control information with the user equipment 100 and/or another base station. The base station 200 may also be referred to as a network access device. For example, the base station 200 may be referred to as a node B, an evolved-node B (eNB), a next generation node B (gNB), a sector, a site, a base transceiver system (BTS), an access point (AP), a relay node, a remote radio head (RRH), a radio unit (RU), and/or a small cell. Hereinafter, the base station 200 (or a cell) may be interpreted as referring to a partial area or function, which is covered by a base station controller (BSC) in CDMA, a node-B in wideband CDMA (WCDMA), an eNB in LTE, a gNB and/or a sector (or site) in 5G, or the like, in a comprehensive sense, and may include various coverage regions, such as a mega cell, a macro cell, a micro cell, a pico cell, a femto cell, a relay node, RRH, RU, and/or a small-cell communication range.

The user equipment 100 and the base station 200 may perform wireless communication using beamforming, and the wireless communication system 1 may define requirements of the user equipment 100 and the base station 200 for the beamforming. For example, the wireless communication system 1 may use a millimeter wave frequency band to increase throughput, and may use the beamforming to overcome the path loss of the millimeter wave. The alignment of beams of the user equipment 100 and the base station 200 may be desired for the wireless communication using the beamforming, and the user equipment 100 and the base station 200 may perform beam training for the beam alignment. For example, the base station 200 may repeatedly transmit information (e.g., one symbol) using a transmission beam 20 during the beam training, and the user equipment 100 may receive the information using a plurality of reception beams 10. The user equipment 100 may determine an optimal reception beam to be used for the wireless communication with the base station 200 based on the plurality of reception beams 10, and may provide information associated with or related to the optimal reception beam to the base station 200, and the optimal reception beam may be used for the wireless communication (e.g., transmission and/or reception of a payload) between the user equipment 100 and the base station 200. For example, the plurality of reception beams 10 may correspond to the plurality of beams described with reference to FIG. 1, and the optimal reception beam may correspond to the present beam corresponding to the best beam described with reference to FIG. 1.

As the wireless communication environment between the user equipment 100 and the base station 200 changes due to the mobility of the user equipment 100, obstacles near at least some of the plurality of antennas 120, or the like, the beam training may be frequently performed. Therefore, it may be advantageous to quickly determine the optimal reception beam (or the best reception beam) through the beam training in the wireless communication system 1. For example, a channel (e.g., wireless channel) between the user equipment 100 and the base station 200 may be estimated, the reinforcement learning-based beam training operation described with reference to FIG. 1 may be performed based on the estimated channel, the optimal reception beam selected and/or updated based on the beam training operation may be used for wireless communication, and thus the optimal reception beam providing relatively high efficiency (e.g., beamforming gain) may be used for wireless communication. Hereinafter, although some example embodiments will be focused on the operations of the user equipment 100 performing the reinforcement learning-based beam training operation, it will be understood that, according to other example embodiments, the base station 200 may perform the reinforcement learning-based beam training operation in the same or similar manner.

The user equipment 100 may include the plurality of antennas 120 for the beamforming, and the plurality of antennas 120 may be referred to as an antenna array. In some example embodiments, the plurality of antennas 120 may include a plurality of sub-arrays respectively forming a plurality of beams. In some example embodiments, a sub-array may collectively refer to element antennas included therein and components (e.g., phase shifters) of the precoder 140 that correspond to the element antennas. A sub-array may receive a radio frequency (RF) signal from an RF chain included in the transceiver 160 or may transmit an RF signal to the RF chain. For example, when the number of sub-arrays is different from the number of RF chains in the transceiver 160, switches and/or multiplexers may be arranged between the sub-arrays and the RF chains. Hereinafter, it is assumed that the numbers of sub-arrays and RF chains are M (where M is an integer greater than or equal two) and thus are the same as each other, however, example embodiments are not limited thereto. In some example embodiments, the plurality of antennas 120 may be used for spatial diversity, polarization diversity, spatial multiplexing, or the like.

The precoder 140 may provide signals for forming a beam to the plurality of antennas 120 based on a control signal CTRL. In some example embodiments, the precoder 140 may include a plurality of phase shifters receiving the control signal CTRL and/or a plurality of amplifiers (e.g., power amplifiers or low-noise amplifiers), and may be referred to as an analog precoder. For example, in a transmission mode, the precoder 140 may receive first to M-th RF signals RF_1, . . . , RF_M from the transceiver 160, may amplify the first to M-th RF signals RF_1 to RF_M based on the control signal CTRL, and/or may adjust phases of the first to M-th RF signals RF_1 to RF_M based on the control signal CTRL. In a reception mode, the precoder 140 may generate the first to M-th RF signals RF_1 to RF_M by amplifying signals received through the plurality of antennas 120 based on the control signal CTRL and/or by adjusting phases of the signals received through the plurality of antennas 120 based on the control signal CTRL.

The transceiver 160 may include first to M-th RF chains 161_1, . . . , 161_M. In some example embodiments, the transceiver 160 may be referred to as an RF integrated circuit (RFIC). An RF chain may refer to a path for independently processing an RF signal and may include, for example, an amplifier, a filter, and/or a mixer. In some example embodiments, the RF chain may further include an analog-to-digital converter (ADC) and/or a digital-to-analog converter (DAC). In some example embodiments, the transceiver 160 may include switches and/or multiplexers, and the RF chains may be reconfigured by the switches and/or multiplexers. The first to M-th RF chains 161_1 to 161_M may respectively generate the first to M-th RF signals RF_1 to RF_M by respectively processing first to M-th baseband signals BB_1, . . . , BB_M in the transmission mode, and may respectively generate the first to M-th baseband signals BB_1 to BB_M by respectively processing the first to M-th RF signals RF_1 to RF_M in the reception mode.

The signal processor 180 may provide the first to M-th baseband signals BB_1 to BB_M to the transceiver 160, and may receive the first to M-th baseband signals BB_1 to BB_M from the transceiver 160. The signal processor 180 may be referred to as a communication processor, a baseband processor, or the like, and may include logic hardware designed through logic synthesis, and/or may include a central processing unit including a core and software including a series of instructions executable by the core. For example, the signal processor 180 may include a data processor 182 and a beam controller 184.

The data processor 182 may generate transmission data including information to be provided to the base station 200, and may generate the first to M-th baseband signals BB_1 to BB_M (or digital signals corresponding to the first to M-th baseband signals BB_1 to BB_M) from the transmission data. In addition, the data processor 182 may generate reception data, which includes information provided by the base station 200, from the first to M-th baseband signals BB_1 to BB_M (or digital signals corresponding to the first to M-th baseband signals BB_1 to BB_M). For example, the data processor 182 may include an encoder, a decoder, a modulator, and/or a demodulator. In some example embodiments, the data processor 182 may include a precoder (e.g., a digital precoder) for the beamforming. Accordingly, the data processor 182 may receive beamforming information from the beam controller 184, and may perform precoding based on the beamforming information.

The beam controller 184 may perform beam training according to the example embodiment described with reference to FIG. 1, and may define beamforming information for a beam formed by the plurality of antennas 120. For example, the beam controller 184 may obtain at least one of a probability distribution and a value function, may select a candidate beam from among the plurality of reception beams 10 based on at least one of the probability distribution and the value function, may perform a present training operation based on the candidate beam and a beam selected by at least one previous training operation, and may select a present beam corresponding to the best beam based on a result of the present training operation. For example, the beam controller 184 may define beamforming information for the result of the present training operation and the present beam, and may generate the control signal CTRL based on the beamforming information. In some example embodiments, when the data processor 182 includes the digital precoder, the beam controller 184 may provide the beamforming information to the digital precoder.

Figure 3:
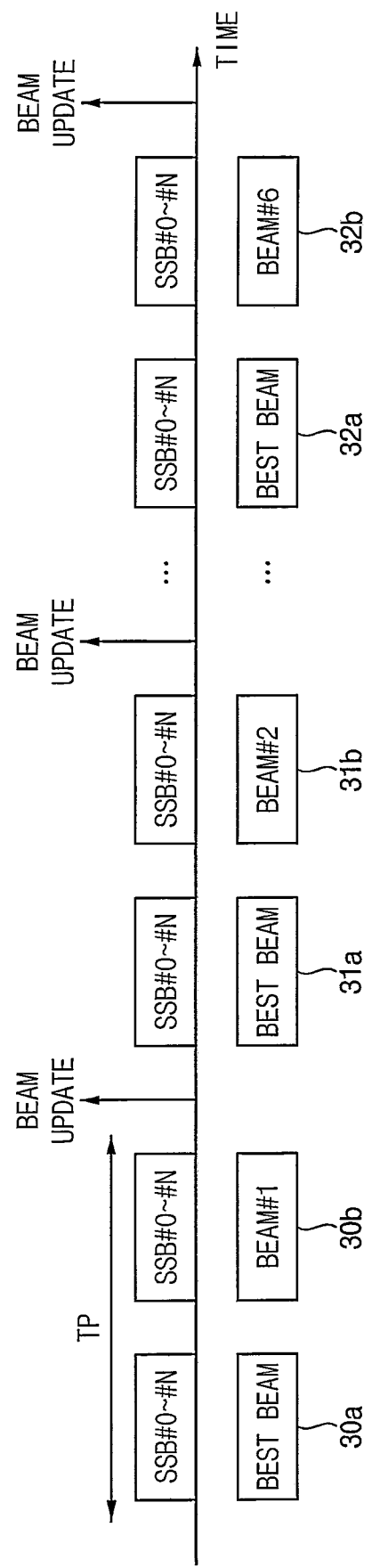
FIG. 3 illustrates a conventional beam training scheme that is performed based on a fixed training sequence.
Figure 4:
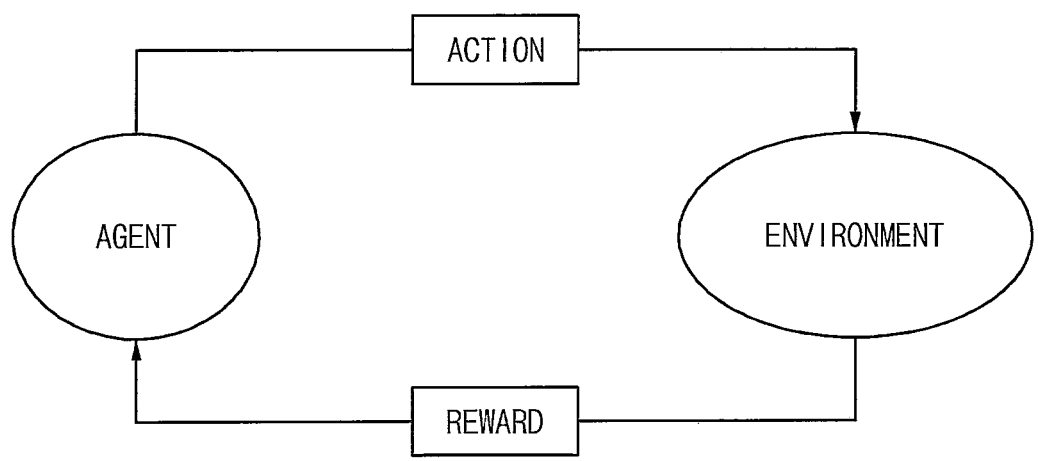
FIG. 4 illustrates the reinforcement learning that is a basis of the method of performing beam training according to some example embodiments.
Figure 5:
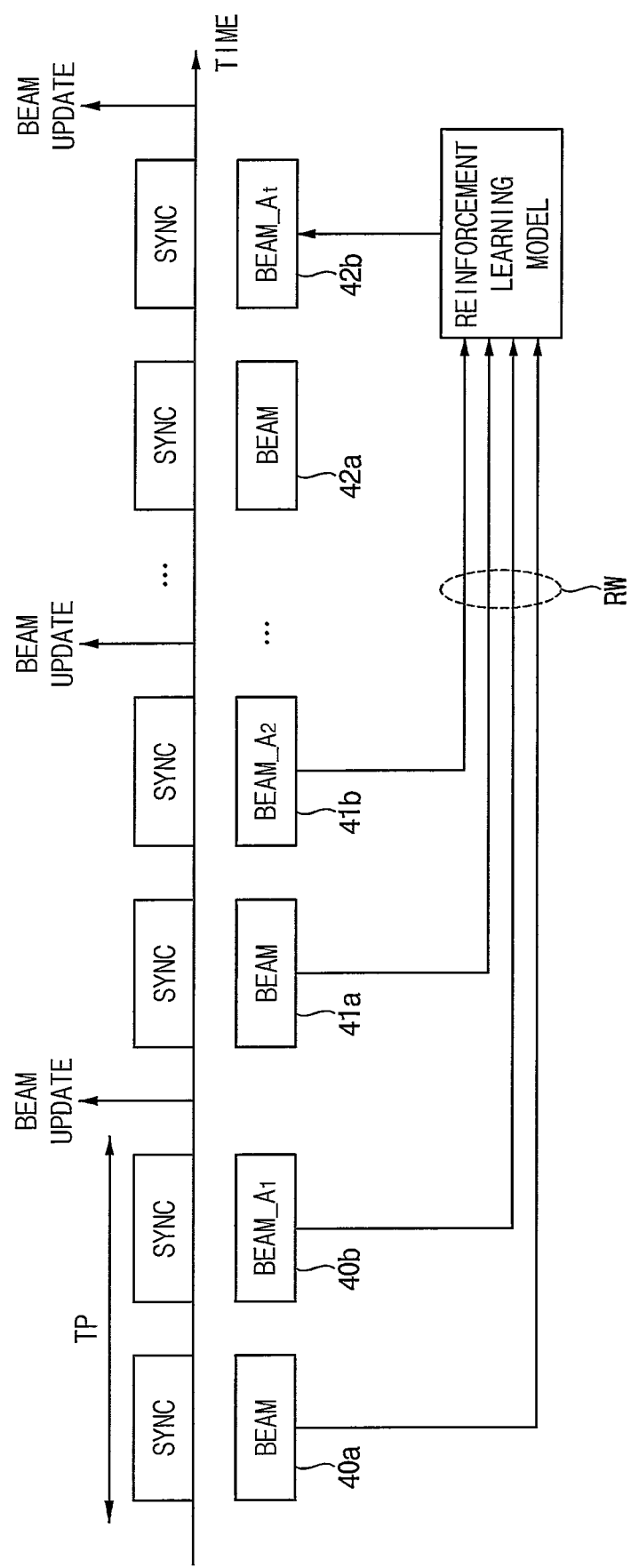
FIG. 5 illustrates a beam training scheme according to some example embodiments that is implemented based on the reinforcement learning and is performed based on an adaptive training sequence.

FIGS. 3, 4 and 5 are diagrams for describing a method of performing beam training according to example embodiments.

FIG. 3 illustrates a conventional beam training scheme that is performed based on a fixed training sequence. FIG. 4 illustrates the reinforcement learning that is a basis of the method of performing beam training according to some example embodiments. FIG. 5 illustrates a beam training scheme according to some example embodiments that is implemented based on the reinforcement learning and is performed based on an adaptive training sequence. FIGS. 3 and 5 illustrate examples in which a receiver or receiving end (e.g., the user equipment 100 in FIG. 2) selects the best reception beam (or optimal reception beam) and a total of seven reception beams of BEAM #0, BEAM #1, BEAM #2, BEAM #3, BEAM #4, BEAM #5 and BEAM #6 are used.

Referring to FIG. 3, the conventional beam training scheme may be performed using reception beam indices of a fixed sequence. For example, in one training phase TP, a transmitter or transmitting end (e.g., the base station 200 in FIG. 2) may transmit a synchronization signal block (SSB) burst twice, and the receiver may receive the transmitted SSB bursts using different reception beams and may detect or search the best reception beam by evaluating the received SSB bursts. For example, the receiver may use the reception beam that is most recently selected (e.g., the reception beam that is selected as a result of immediately preceding training operation) to track an offset parameter of the channel, and may perform a beam update operation based on (e.g. by comparing) quality of the reception beam that is most recently selected with quality of the reception beam that is newly trained, after each training operation is completed.

For example, BEAM #0 may be provided as an initial best beam 30a, and a fixed training sequence may be provided in an order of BEAM #1, BEAM #2, . . . , BEAM #6. In a first training phase, the receiver may perform a first training operation in which a SSB burst SSB #0~#N is received twice using the initial optimal beam 30a of BEAM #0 and a first training beam 30b of BEAM #1, may perform the beam update operation by evaluating the received SSB bursts, and may select a first best beam 31a as a result of the first training operation. For example, BEAM #0 or BEAM #1 may be selected as the first best beam 31a. In a second training phase subsequent to the first training phase, the receiver may perform a second training operation in which the SSB burst SSB #0~#N is received twice using the first best beam 31a selected as the result of the first training operation and a second training beam 31b of BEAM #2, may perform the beam update operation by evaluating the received SSB bursts, and may select a second best beam as a result of the second training operation. Similarly, in a sixth training phase, the receiver may perform a sixth training operation in which the SSB burst SSB #0~#N is received twice using a fifth best beam 32a selected as a result of a fifth training operation performed prior to the sixth training operation and a sixth training beam 32b of BEAM #6, may perform the beam update operation by evaluating the received SSB bursts, and may select a sixth best beam as a result of the sixth training operation.

In the conventional beam training scheme of FIG. 3, the training sequence may be represented as Equation 1.

$$\text{Current training bean sequence: } \tilde{k} \rightarrow d(\tilde{k}+1, K) \rightarrow \text{mod}(\tilde{k}+2, K),$$  [Equation 1]

In Equation 1, $\tilde{k}$ denotes an index of the present training beam, and K denotes the number of the plurality of reception beams.

Because the conventional beam training scheme of FIG. 3 always has the fixed training sequence, there are problems in that it is difficult to properly respond to a time-varying channel, the best beam is not rapidly detected within a limited training sequence, and the training overhead increases.

Referring to FIG. 4, in the online reinforcement learning, an environment may provide a certain reward for a certain action when an agent, which is a subject of an action, takes the certain action, and a policy of selecting the action may be determined and/or modified based on actions that were previously taken and rewards that were observed therefrom. For example, the agent may correspond to or represent a reinforcement learning model.

In the online reinforcement learning, the policy may be established to have the highest reward expectation. In each round (or stage or step), the environment may generate the reward based on a distribution that is unknown to the agent. Because only a limited environment can be used in each round, it may be desirable to control or adjust the trade-off between exploration and exploitation to improve information associated with the distribution of the reward and to find the best or optimal action. The exploration may represent an operation of exploring or searching the environment, and the exploitation may represent an operation of empirically making the best or optimal choices based on observed reward.

The best or optimal beam training problem or beam selection problem according to some example embodiments may be performed based on a multi-arm bandit problem, which is one of the online reinforcement learning. The multi-arm bandit problem may represent a candidate selection scheme that maximizes the expected benefit in a situation where the available information is limited. In the multi-arm bandit problem, a machine that is selectable in each round may generate a reward based on a distribution unknown to a user, only a limited number of machines may be used in each round, and a result of selection may not be obtained or may be obtained only limitedly at a time of selection.

When substituting the multi-arm bandit problem into the best or optimal beam training problem or beam selection problem according to some example embodiments, it may be interpreted as a situation in which a limited number of beams are assigned or allocated to a training operation at a time. For example, a policy of selecting the candidate beam in the present training operation may be determined based on an action of selecting at least one previous candidate beam in the at least one previous training operation and a reward corresponding to a result of the at least one previous training operation. In addition, each round (or stage) may correspond to one training phase in which one training operation is performed.

Referring to FIG. 5, the beam training scheme according to some example embodiments may be performed using reception beam indices of an adaptive (or variable) sequence that is not fixed. The descriptions overlapping those of FIG. 3 will be omitted.

For example, one of BEAM #0, BEAM #1, BEAM #2, BEAM #3, BEAM #4, BEAM #5 and BEAM #6 may be provided as an initial beam 40a. In a first training phase, the reinforcement learning model (e.g., the multi-arm bandit model) included in the receiver may select a first training beam (BEAM_$A_1$) 40b based on the policy, and the receiver may perform a first training operation in which a synchronization signal SYNC is received using the initial beam 40a and the first training beam 40b, may select a first best beam as a result of the first training operation, and may update a reward RW and the policy based on the result of the first training operation. In a second training phase subsequent to the first training phase, the reinforcement learning model may select a second training beam (BEAM_$A_2$) 41b based on the updated policy, and the receiver may perform a second training operation in which the synchronization signal SYNC is received using a first beam 41a and the second training beam 41b, may select a second best beam as a result of the second training operation, and may update the reward RW and the policy based on the result of the second training operation. Similarly, in a t-th training phase, where t is a natural number greater than or equal to three, the reinforcement learning model may select a t-th training beam (BEAM_$A_t$) 42b based on the updated policy, and the receiver may perform a t-th training operation in which the synchronization signal SYNC is received using a (t−1)-th beam 42a and the t-th training beam 42b, may select a t-th best beam as a result of the t-th training operation, and may update the reward RW and the policy based on the result of the t-th training operation.

In some example embodiments, the synchronization signal SYNC may include the SSB burst as described with reference to FIG. 3. However, example embodiments are not limited thereto. For example, the synchronization signal SYNC may include a primary synchronization signal (PSS) and/or a secondary synchronization signal (SSS), or other various reference signals.

In some example embodiments, the beams 40*a*, 41*a* and 42*a* in FIG. 5 each may correspond to the best beam selected in the previous training phase. For example, the initial beam 40*a* may correspond to an initial best beam provided at an initial operation time, the first beam 41*a* may correspond to the first best beam selected in the first training phase, and the (t−1)-th beam 42*a* may correspond to a (t−1)-th best beam selected as a result of a (t−1)-th training operation. For example, in one training phase (e.g., the first training phase), two beams (e.g., the initial best beam 40*a* and the first training beam 40*b*) used for the training operation may correspond to the previous beam and the candidate beam in FIG. 1, and the beam (e.g., the first best beam 41*a*) updated based on a result of the training operation may correspond to the present beam in FIG. 1. In some example embodiments, the beam (e.g., the initial best beam 40*a*) used in one training phase (e.g., the first training phase) and corresponding to the previous beam may be referred to as the present beam rather than the previous beam, and step S400 in FIG. 1 may be described as updating the present beam.

In other example embodiments, as with the training beams 40*b*, 41*b* and 42*b* in FIG. 5, the beams 40*a*, 41*a* and 42*a* in FIG. 5 may correspond to training beams selected based on the policy of the reinforcement learning model. In other words, some example embodiments may be applied to not only a beam sweeping using one best beam and one training beam, but also a beam sweeping using two training beams.

The method of performing beam training according to some example embodiments may not need prior information such as a distribution of angle of arrival (AOA). For example, a uniform distribution of angle of arrival may be assumed in an initial operation time, and the receiver may initially form a set of training beams having a size of K, where K is a natural number greater than or equal to two, and may receive a training beam response to update the set of training beams. A non-uniform and near-optimal distribution may be formed by gradually training the channel. In some example embodiments, the receiver may perform an initial training operation based on the scheme described with reference to FIG. 3.

Although not described in detail, the best or optimal transmission beam may also be detected or searched similarly to the method described above. For example, in one training phase, the transmitter may transmit the SSB burst using different transmission beams, and the receiver may detect or search the best transmission beam by evaluating the received SSB burst.

Figure 6:
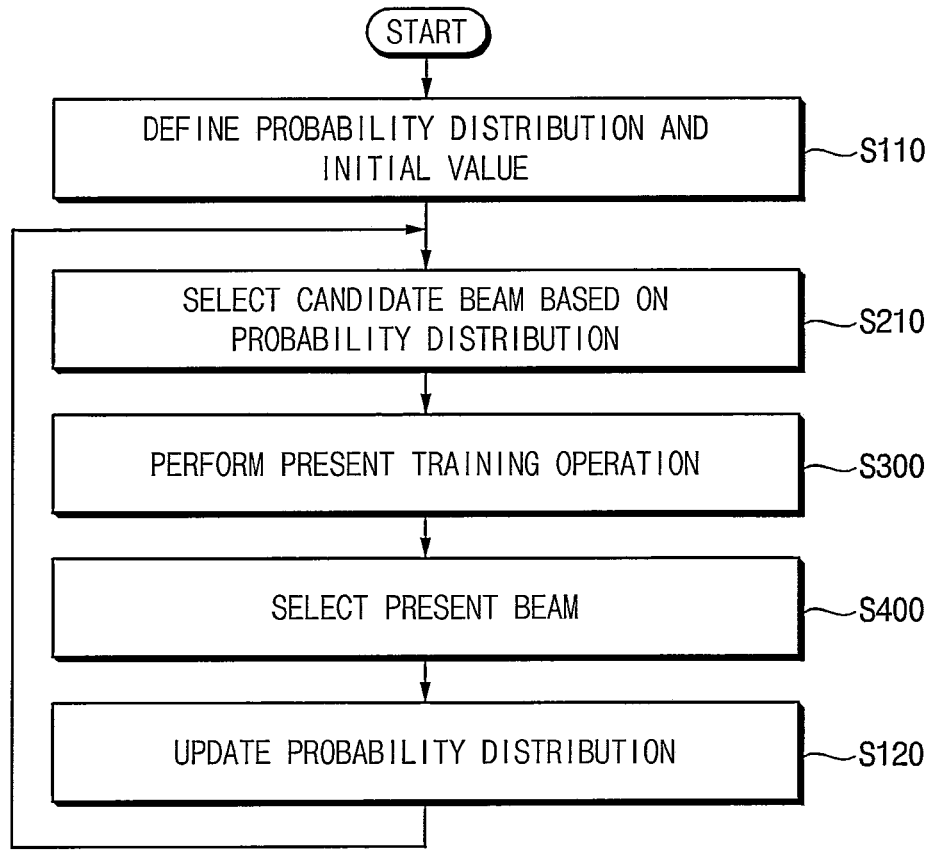
FIG. 6 is a flowchart illustrating an example of a method of performing beam training of FIG. 1.
Figure 7:
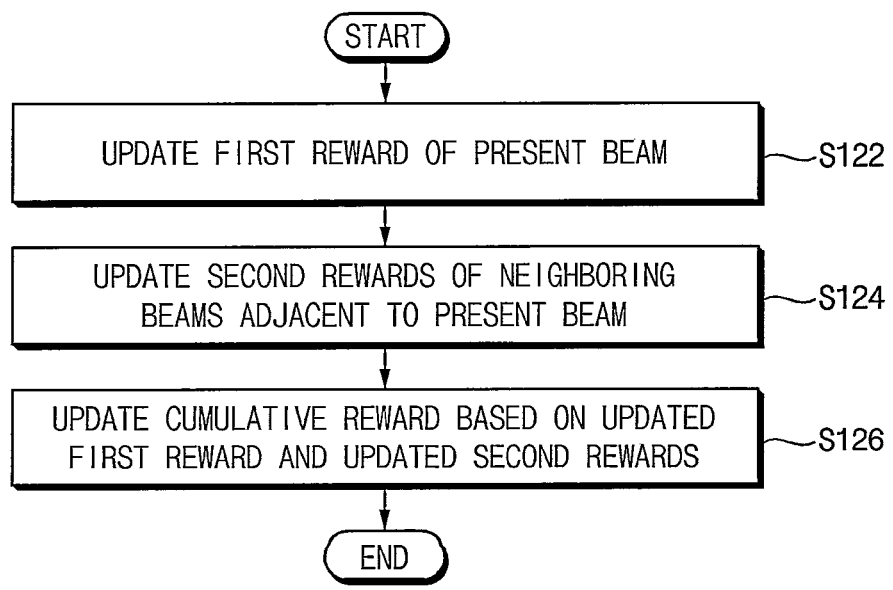
FIG. 7 is a flowchart illustrating an example of updating a probability distribution in FIG. 6.

FIG. 6 is a flowchart illustrating an example of a method of performing beam training of FIG. 1. FIG. 7 is a flowchart illustrating an example of updating a probability distribution in FIG. 6.

Referring to FIGS. 6 and 7, in the method of performing beam training according to some example embodiments, a policy of selecting the candidate beam may be determined using the adversarial bandit model based on the exponential-weight algorithm for exploration and exploitation.

For example, a probability distribution and an initial value of the probability distribution may be defined (step S110), the candidate beam may be selected based on the probability distribution (step S210), the present training operation may be performed based on the candidate beam and the previous beam (step S300), the present beam may be selected based on the result of the present training operation (step S400), and the probability distribution may be updated based on the result of the present training operation (step S120). Steps S110 and S120 may correspond to step S100 in FIG. 1, step S210 may correspond to step S200 in FIG. 1, and Steps S300 and S400 may be substantially the same as steps S300 and S400 in FIG. 1, respectively.

When updating the probability distribution (step S120), a first reward of the present beam may be updated (step S122), second rewards of neighboring beams adjacent to the present beam may be updated (step S124), and a cumulative reward may be updated based on the updated first reward and the updated second rewards (step S126).

The adversarial bandit model does not assume about how reward values are generated. For each round, the agent selects a distribution $P_t$ for an action, an action $A_t$ taken next is obtained from the distribution $P_t$, and the agent gets a reward $X_t$ as a result. In other words, main assumptions of the adversarial bandit model are as follows: 1) the user selects the distribution $P_t$ and determines the action $A_t$ from it; and 2) the user observes the reward $X_t$.

A key aspect of the adversarial bandit model (or modeling) is estimating rewards for unselected actions. If $P_t$ is a conditional distribution of actions taken during t rounds, where $t \in \{1, 2, \ldots T\}$, $P_{tk}$ may be represented as a conditional probability by Equation 2.

$$P_{tk} = Pr\{A(t) = k | A(1), X_1, \ldots, A_{t-1}, X_{t-1}\} \qquad \text{[Equation 2]}$$

Here, an importance weighted estimate of $X_{tk}$ may be represented as Equation 3.

$$\hat{X}_{tk} = I\{A_t = k\} X_t / P_{ti} \qquad \text{[Equation 3]}$$

Through (t−1) rounds (e.g., from a first round to a (t−1)-th round), a conditional mean of $\hat{X}_{ti}$ may satisfy Equation 4.

$$E_{t-1}[\hat{X}_{ti}] \qquad \text{[Equation 4]}$$

In Equation 4, $\hat{X}_{ti}$ denotes an unbiased estimate of $X_{ti}$ based on observations during the (t−1) rounds.

In some example embodiments, it may be assumed or defined that $$\hat{S}_k(t) = \sum_{t=1}^{T} \hat{X}_k(t)$$

is an estimate of a cumulative reward of a k-th beam among the plurality of beams up to or until t rounds (e.g., from a first round to a t-th round), where k is an integer greater than or equal to one and less than or equal to K and K is the number of the plurality of beams. For example, a policy may be determined such that $\hat{S}_k(t)$ becomes the maximum. There are various schemes to map $\hat{S}_k(t)$ to a probability distribution, and one of the most well-known schemes is to use an exponential weight, which may be represented as Equation 5.

$$p_k(t) = (1-\gamma) \frac{\exp\left(\rho \sum_{t=1}^{T_k(t+1)} \hat{X}_k(t)\right)}{\sum_{j=1}^{K} \exp\left(\rho \sum_{n=1}^{T_j(t+1)} \hat{X}_j(t)\right)} + \frac{\gamma}{K} = \qquad \text{[Equation 5]}$$

-continued $$(1-\gamma)\frac{\exp(\rho\hat{S}_k(t))}{\sum_{j=1}^{K}\exp(\rho\hat{S}_j(t))} + \frac{\gamma}{K}$$

In Equation 5, $p_k(t)$ denotes a probability distribution of the k-th beam, $T_k(t+1)$ denotes the number of times the k-th beam is selected up to (t+1) rounds, $\gamma$ denotes a parameter used to adjust a ratio between exploration and exploitation, and $\rho>0$ denotes a training rate.

The probability distribution $p_k(t)$ may be implemented in a combination of a uniform distribution and a distribution associated with the cumulative reward. In the EXP3 algorithm, a beam with a higher exponential weight may be trained with a probability of $(1-\gamma)$ (exploitation), and beams may be selected equally with a probability of $\gamma$ (exploration). As the training rate $\rho$ increases, $p_k(t)$ may concentrate on a beam index corresponding to the largest reward, and the algorithm may be implemented to devote more weight to exploitation. As the training rate $\rho$ decreases, beams may be selected more equally based on $p_k(t)$ and the algorithm may be implemented to perform explorations more often. A reward function associated with the reward may be provided as Equation 6.

$$\hat{X}_k(t) = \begin{cases} \frac{\alpha}{p_k(t)} & \text{if } SINR_k \geq \tau \\ \frac{-\beta}{1-p_k(t)} & \text{if } SINR_k < \tau \end{cases} \quad \text{[Equation 6]}$$

In Equation 6, $\hat{X}_k(t)$ denotes a reward or a reward function of the k-th beam, each of $\alpha>0$ and $\beta>0$ denotes a training rate, $SINR_k$ denotes a signal-to-interference-plus-noise ratio, and ti denotes performance criterion.

Rewards of untrained beams may not be observed, however, it may be assumed that there is a high correlation of rewards between neighboring beams. Thus, a reward to which weights of neighboring beams are added may be updated as Equation 7.

$$\hat{X}_{k-1}(t)=w_1\hat{X}_k(t) \text{ and } \hat{X}_{k+1}(t)=w_2\hat{X}_k(t) \quad \text{[Equation 7]}$$

In Equation 7, $\hat{X}_{k-1}(t)$ and $\hat{X}_{k+1}(t)$ denote rewards or reward functions of a (k−1)-th beam and a (k+1)-th beam adjacent to the k-th beam, respectively, and $w_1$ and $w_2$ denote weights used to update the rewards or the reward functions of the (k−1)-th beam and the (k+1)-th beam, respectively.

In other words, in step S110, the probability distribution may be defined by Equation 5. In step S122, the first reward may be obtained based on Equation 6. In step S124, the second rewards may be obtained based on Equation 7. In step S126, $$\hat{S}_k(t) = \sum_{t=1}^{T}\hat{X}_k(t),$$

which is the estimate of the cumulative reward may be updated based on the rewards updated by Equation 6 and Equation 7.

In some example embodiments, the initial value in step S110 may corresponds to a uniform distribution, and may be represented as Equation 8.

$$\{p_k(t)\}_{k=1}^{K} \text{ where } p_k(t)=1/K \quad \text{[Equation 8]}$$

The framework of the beam training using the EXP3-based adversarial bandit model described with reference to FIGS. 6 and 7 may be represented as Table 1.

TABLE 1

Algorithm: EXP3 for optimizing training beam sequence

Initialize: a uniform optimal beam prior $\{p_k(t)\}_{k=1}^{K}$
where $p_k(t) = 1/K$
Output: Estimated optimal beam prior
1. Select beam with probability distribution $$p_k(t) = (1-\gamma)\frac{\exp(\rho\hat{S}_k(t))}{\sum_{j=1}^{K}\exp(\rho\hat{S}_j(t))} + \frac{\gamma}{K}$$

2. Perform beam training and measure training beam response

3. Update the reward $$\hat{X}_k(t) = \begin{cases} \frac{\alpha}{p_k(t)} & \text{if } SINR_k \geq \tau \\ \frac{-\beta}{1-p_k(t)} & \text{if } SINR_k < \tau \end{cases}$$

4. Update the reward of neighboring beams
$\hat{X}_{k-1}(t) = w_1\hat{X}_k(t)$ and $\hat{X}_{k+1}(t) = w_2\hat{X}_k(t)$ 5. Update the corresponding cumulative rewards $$\hat{S}_k(t) = \sum_{t=1}^{T}\hat{X}_k(t), k = 1, \ldots, K$$

Figure 8:
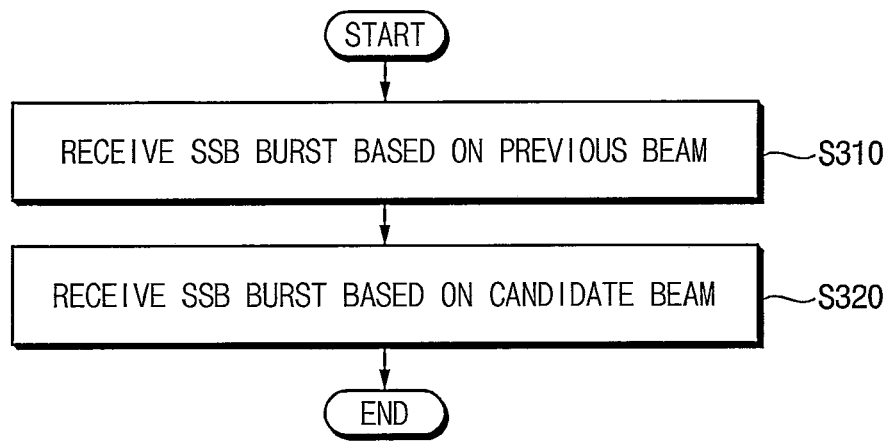
FIG. 8 is a flowchart illustrating an example of performing a present training operation in FIG. 1.

FIG. 8 is a flowchart illustrating an example of performing a present training operation in FIG. 1.

Referring to FIGS. 1 and 8, when performing the present training operation (step S300), the SSB burst may be received based on the previous beam (step S310), and the SSB burst may be received based on the candidate beam (step S320). For example, steps S310 and S320 in FIG. 8 may correspond to the operation in one training phase described with reference to FIG. 5. However, example embodiments are not limited thereto, and the SSB burst may be replaced with other various reference signals.

In some example embodiments, when implemented to detect the best transmission beam, step S310 may be changed to transmitting the SSB burst based on the previous beam and step S320 may be changed to transmit the SSB burst based on the candidate beam.

Figure 9:
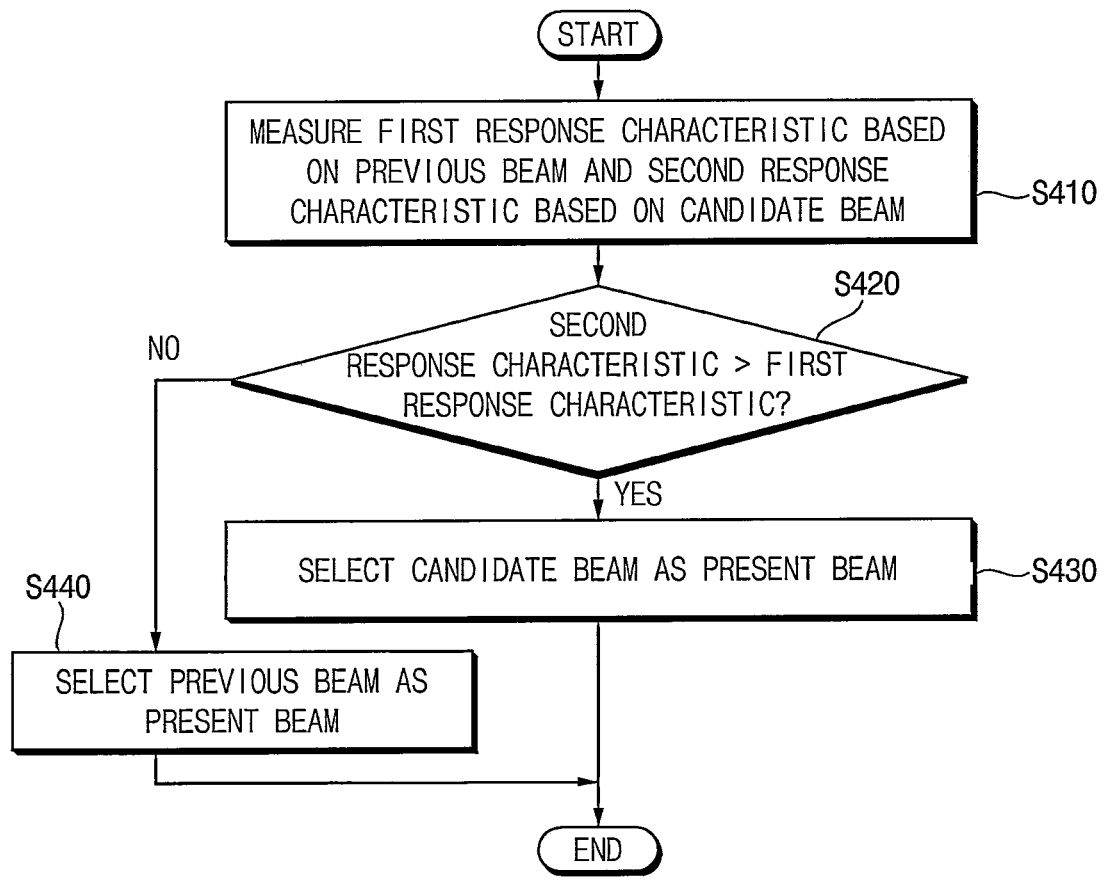
FIG. 9 is a flowchart illustrating an example of selecting a present beam in FIG. 1.

FIG. 9 is a flowchart illustrating an example of selecting a present beam in FIG. 1.

Referring to FIGS. 1 and 9, when selecting the present beam (step S400), a first response characteristic based on the previous beam and a second response characteristic based on the candidate beam may be measured (step S410), and the first response characteristic and the second response characteristic may be evaluated or compared with each other (step S420).

When the second response characteristic is higher than the first response characteristic (step S420: YES), the candidate beam may be selected as the present beam (step S430). When the first response characteristic is higher than or equal to the second response characteristic (step S420: NO), the previous beam may be selected as the present beam (step S440).

In some example embodiments, the first response characteristic and the second response characteristic may be obtained based on a beamforming gain. The beamforming gain may be a metric value defined to represent efficiency obtained by a beam, and a beam having a higher beamforming gain may be considered more appropriate. In other words, a beam having a higher beamforming gain may be selected as the present beam.

FIGS. 10, 11A, 11B and 12 are diagrams for describing a method of performing beam training of FIG. 6.

Referring to FIG. 10, a result of evaluating performance of the method of performing beam training according to some example embodiments under a time-varying channel is illustrated. The EXP3-based framework described with reference to FIGS. 6 and 7 was used, and the parameters of the EXP3 were set to $\gamma=0.01$, $\rho=0.01$, $\alpha=1$, $\beta=50$, and $\tau$=optimal beamforming gain*0.98.

As described with reference to FIGS. 3 and 5, a total of seven reception beams may be used, and BEAM #0, BEAM #1, BEAM #2, BEAM #3, BEAM #4, BEAM #5 and BEAM #6 may be mapped to beam indices of 1, 2, 3, 4, 5, 6 and 7, respectively. In addition, it was implemented to change the angle of arrival of about 30 degrees in a tenth training phase, and thus the best or optimal beam index may be 2 in first to ninth training phases and may be 4 in tenth to twentieth training phases.

In FIG. 10, a fixed training sequence may correspond to the conventional beam training scheme described with reference to FIG. 3, and an adaptive training sequence may correspond to the beam training scheme according to the example embodiments described with reference to FIG. 5. In each training sequence, a beam index on the upper left may correspond to the previous beam, a hatched beam index on the upper right may correspond to the candidate beam, and a beam index on the lower right may correspond to the present beam. An order of selecting (or arranging) the hatched beam indices may represent the training sequence.

For example, the fixed training sequence may be implemented as 3, 4, 5, 6, 7, 1, 3, 4, 5, 6, 7, 1, 2, 4, 5, 6, 7, 1, 2 and 3, and it can be seen that the beams are selected based on a fixed order. In contrast, the adaptive training sequence may be implemented as 4, 3, 3, 3, 3, 5, 1, 1, 3, 3, 2, 4, 1, 3, 3, 3, 3, 5, 3 and 3, and it can be seen that the candidate beams are selected based on a random order that is not a fixed order and more training is performed on a specific beam.

Referring to FIG. 11A, probabilities trained depending on the result of evaluating performance of FIG. 10 are illustrated. It can be seen that the priority is focused on the present optimal beam in the first to tenth training phases and the probability distribution detects and trains the change of the channel after the angle of arrival of the channel is changed in the tenth training phase.

Figure 11B:
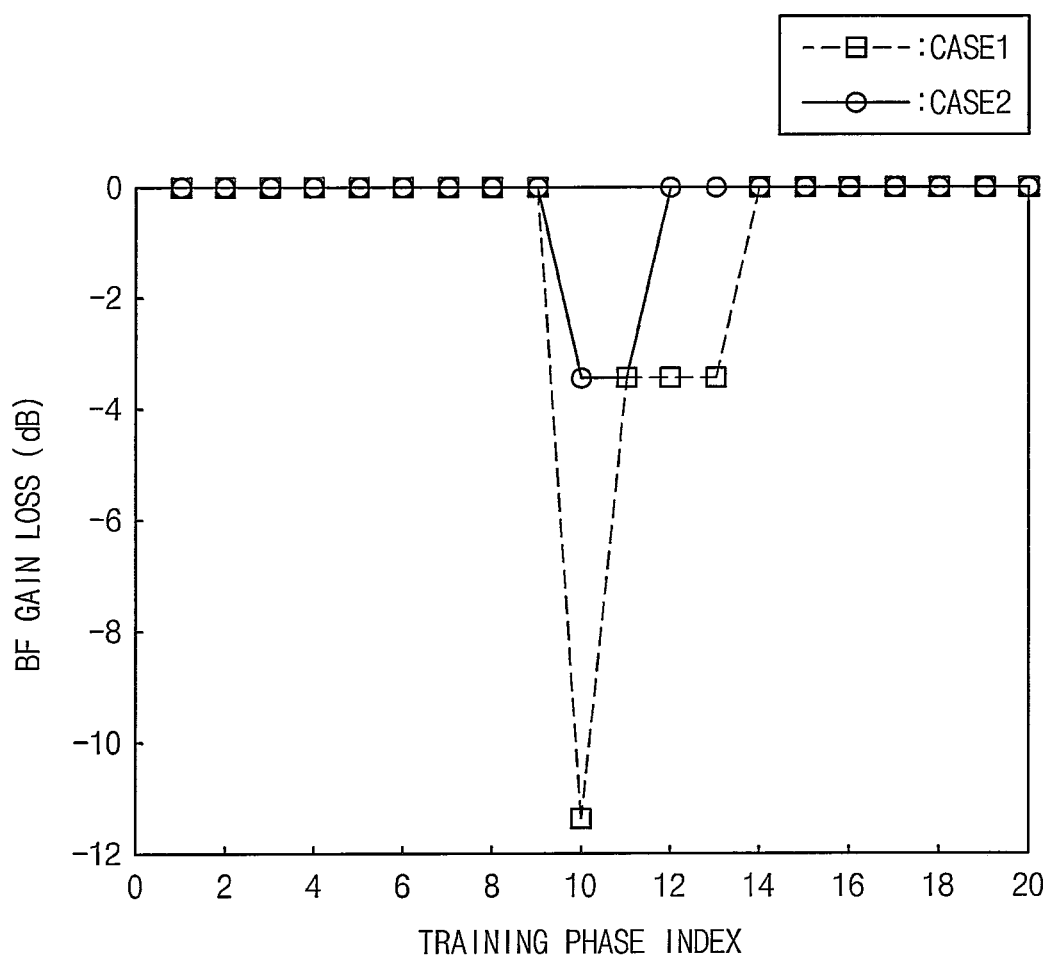

Referring to FIG. 11B, beamforming (BF) gain loss depending on the result of evaluating performance of FIG. 10 is illustrated. CASE1 represents the fixed training sequence in FIG. 10 (e.g., the beamforming gain loss in the conventional beam training scheme described with reference to FIG. 3). CASE2 represents the adaptive training sequence in FIG. 10 (e.g., the beamforming gain loss in the beam training scheme according to example embodiments described with reference to FIG. 5). It can be seen that a relatively small gain loss is maintained in the beam training scheme according to the example embodiments even with a sudden change in the angle of arrival, and this is because a higher probability may be assigned to a beam pointing to a changed channel direction.

Figure 12:
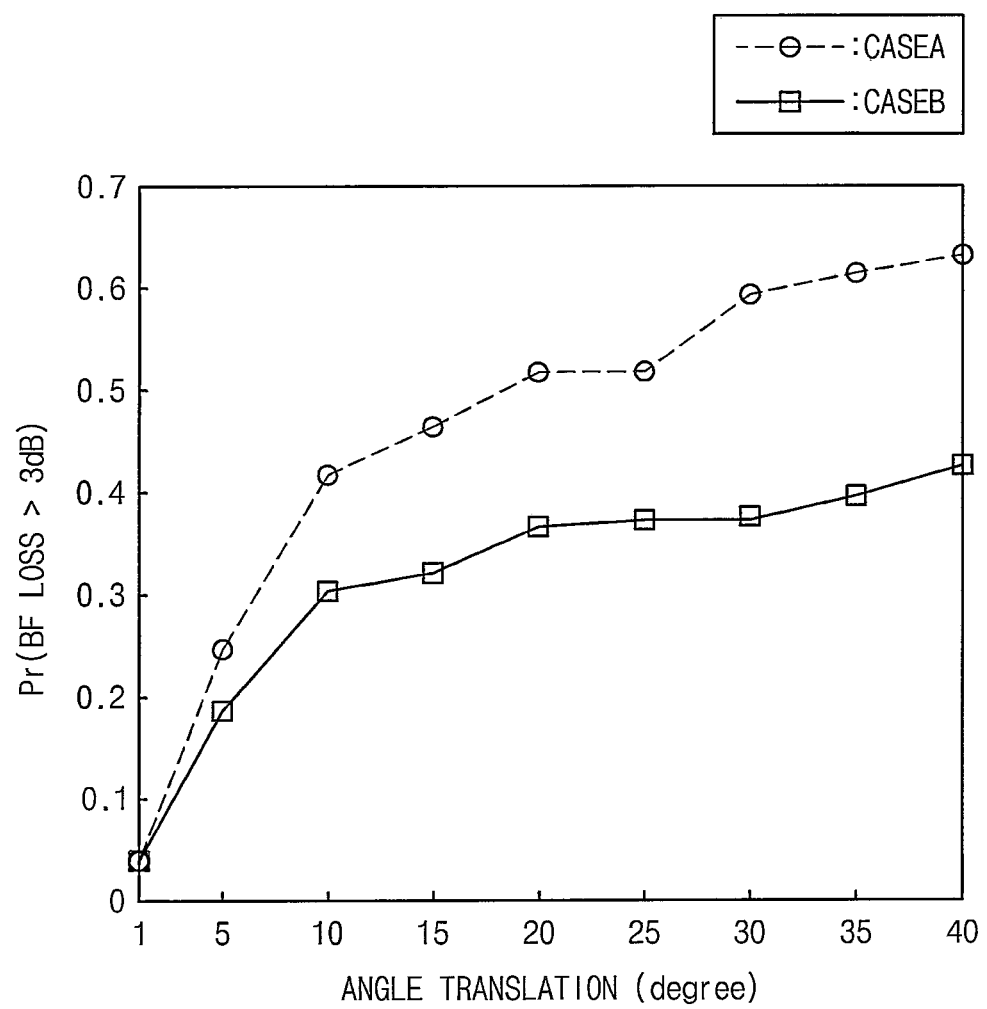

Referring to FIG. 12, beamforming gain loss depending on a change in the angle of arrival is illustrated. CASEA represents the fixed training sequence in FIG. 10 (e.g., the beamforming gain loss in the conventional beam training scheme described with reference to FIG. 3). CASEB represents the adaptive training sequence in FIG. 10 (e.g., the beamforming gain loss in the beam training scheme according to the example embodiments described with reference to FIG. 5). The change in the angle of arrival was selected from about 1, 5, 10, 15, 20, 25, 30, 35 and 40 degrees. It can be seen that the beam training scheme according to the example embodiments has better performance than that of the conventional beam training scheme, and this is because the beams adjacent to the optimal beam are trained more frequently. In addition, it can be seen that the selected beam is a relatively robust against a sudden change in the angle of arrival.

FIGS. 13, 14, 15A, 15B and 15C are diagrams for describing a method of performing beam training according to some example embodiments.

FIG. 13 illustrates an example of a fixed training sequence in the conventional beam training scheme. FIGS. 14, 15A, 15B and 15C illustrate examples of an adaptive training sequence in the beam training scheme according to some example embodiments.

Referring to FIG. 13, in the conventional beam training scheme, a training sequence may be determined based on an equal opportunity scheme. For example, one row in a table of FIG. 13 may be selected as one training sequence. For example, when BEAM #0 is the optimal beam (e.g., in an example of BESTBEAM #0), the training sequence may be determined in an order of BEAM #0, BEAM #1, BEAM #2, BEAM #3, BEAM #4, BEAM #5 and BEAM #6.

Referring to FIG. 14, in the beam training scheme according to some example embodiments, when the EXP3-based framework is used, a training sequence including the at least one previous training operation and the present training operation may be determined based on an unequal opportunity scheme in which neighboring beams adjacent to the present beam are preferentially trained. For example, as with that described with reference to FIG. 13, one row in a table of FIG. 14 may be selected as one training sequence.

For example, the table of FIG. 14 may be divided into two stages of exploitation and exploration, and the training may be repeated until all beams are covered. The neighboring beams adjacent to the optimal beam may be preferentially trained in the exploitation, and the other beams may be sequentially assigned without priority in the exploration. For example, when BEAM #0 is the optimal beam (e.g., in an example of BESTBEAM #0), the training sequence of the candidate beam may be determined in an order of BEAM #0, BEAM #6, BEAM #1, BEAM #2, BEAM #6, BEAM #1, BEAM #3, BEAM #6, BEAM #1, BEAM #4, BEAM #6, BEAM #1 and BEAM #5. For example, when BEAM #0 is the optimal beam, BEAM #6 and BEAM #1 adjacent to BEAM #0 may be selected in the exploitation, and the remaining beams may be selected in the exploration.

Referring to FIGS. 15A, 15B and 15C, in the beam training scheme according to some example embodiments, when the EXP3-based framework is used, a training sequence may be determined based on an unequal opportunity scheme in which neighboring beams adjacent to the present beam are preferentially trained, as described with reference to FIG. 14. In addition, when the present beam corresponds to a change point, the training sequence may be determined based on an adaptive unequal opportunity scheme in which explorations are performed and then exploitations are performed after all explorations are completed. The descriptions overlapping those of FIG. 14 will be omitted.

A scheme of detecting the change point may represent an operation of detecting a sudden change in a statistical distribution. For example, it may be detected whether the probability distribution changes and the change time.

In some example embodiments, when the present beam corresponds to the change point, the training sequence may be determined based on reference signal received power (RSRP) of a left hand side (LHS) neighboring beam and RSRP of a right hand side (RHS) neighboring beam of the present beam.

For example, when the RSRP of the LHS neighboring beam is greater than the RSRP of the RHS neighboring beam, the training sequence of the explorations may be determined as illustrated in FIGS. 15A and 15B. For example, TRAIL #3, TRAIL #6, TRAIL #9 and TRAIL #12 in FIG. 15B may be inserted as BEAM #A, BEAM #B, BEAM #C and BEAM #D at positions of TRAIL #3, TRAIL #6, TRAIL #9 and TRAIL #12 in FIG. 15A, respectively, and the training sequence may be determined based on a combination of tables of FIGS. 15A and 15B. For example, when BEAM #0 is the optimal beam (e.g., in an example of BESTBEAM #0), the training sequence of the candidate beam may be determined in an order of BEAM #0, BEAM #6, BEAM #1, BEAM #6, BEAM #6, BEAM #1, BEAM #5, BEAM #6, BEAM #1, BEAM #4, BEAM #6, BEAM #1 and BEAM #3.

In addition, when the RSRP of the LHS neighboring beam is less than or equal to the RSRP of the RHS neighboring beam, the training sequence of the explorations may be determined as illustrated in FIGS. 15A and 15C. For example, TRAIL #3, TRAIL #6, TRAIL #9 and TRAIL #12 in FIG. 15C may be inserted as BEAM #A, BEAM #B, BEAM #C and BEAM #D at positions of TRAIL #3, TRAIL #6, TRAIL #9 and TRAIL #12 in FIG. 15A, respectively, and the training sequence may be determined based on a combination of tables of FIGS. 15A and 15C. For example, when BEAM #0 is the optimal beam (e.g., in an example of BESTBEAM #0), the training sequence of the candidate beam may be determined in an order of BEAM #0, BEAM #6, BEAM #1, BEAM #1, BEAM #6, BEAM #1, BEAM #2, BEAM #6, BEAM #1, BEAM #3, BEAM #6, BEAM #1 and BEAM #4.

The framework of determining the training sequence based on the adaptive unequal opportunity scheme illustrated in FIGS. 15A, 15B and 15C may be represented as Table 2.

beam. For example, the RSRP of the present beam may be compared with the RSRP of the previous beam, and when loss occurs in the present beam more than a desired (or alternatively, predetermined) first value (e.g., about 5 dB), it may be determined that the present beam corresponds to the change point.

In other example embodiments, it may be determined whether the present beam corresponds to the change point using the RSRP of the present beam and RSRP of the previous beam and additionally using RSRP of the neighboring beams adjacent to the present beam. For example, when the loss occurs in the present beam more than the first value and when loss occur in the neighboring beams more than a desired (or alternatively, predetermined) second value (e.g., about 3 dB), it may be determined that the present beam corresponds to the change point. For example, the second value may be lower than the first value.

When it is determined that the present beam corresponds to the change point (e.g., when an event is detected), explorations may be performed first and then exploitations may be performed after all explorations are completed.

The framework of detecting the change point may be represented as Table 3.

TABLE 3

Event(beam, X-dB): current_RSRP(beam) < previous_RSRP(beam) − loss(X-dB)
Method-1. Event(BEST beam, 5dB)
Method-2. Event(BEST beam; 5dB) && Event(LHS neighbor beam, 3dB) && Event(RHS neighbor beam, 3dB)
If event is detected, 'Exploration' is performed first. All of 'Exploration' is conducted and then 'Exploitation' is performed FIG. 16 is a flowchart illustrating another example of a method of performing beam training of FIG. 1. The descriptions overlapping those of FIG. 6 will be omitted.

Figure 16:
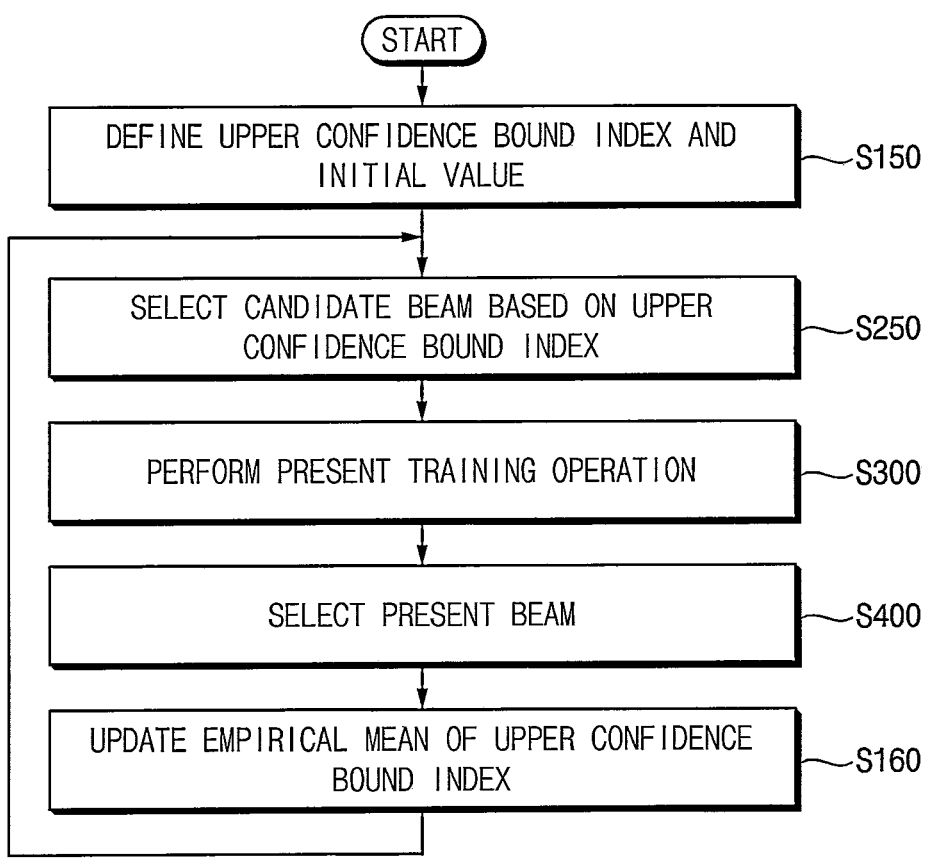
FIG. 16 is a flowchart illustrating another example of a method of performing beam training of FIG. 1.

Referring to FIG. 16, in the method of performing beam training according to some example embodiments, a policy of selecting the candidate beam may be determined using the statistical bandit model based on an upper confidence bound algorithm.

For example, an upper confidence bound index corresponding to the value function and an initial value of the upper confidence bound index may be defined (step S150), the candidate beam may be selected based on the upper confidence bound index (step S250), the present training operation may be performed based on the candidate beam and the previous beam (step S300), the present beam may be selected based on the result of the present training operation (step S400), and an empirical mean of the upper confidence bound index may be updated based on the result of the present training operation (step S160). For example, the initial value of the upper confidence bound index may be set to zero. Steps S150 and S160 may correspond to step S100 in FIG. 1, step S250 may correspond to step S200 in FIG. 1, and Steps S300 and S400 may be the same or substantially the same as steps S300 and S400 in FIG. 1, respectively.

TABLE 2

Definitions: $L_i \triangleq f(i - 1)$ and $R_i \triangleq f(i + 1)$ denote the neighboring beam indices to left and right sides from the beam index I, respectively, and f(a) outputs mod7(a) if a > 0 otherwise, a + 7.
If RSRP($L_i$) > RSRP($R_i$) at the Exploit phase, in what follows, the order of beam indices for each Exploration phase is given by $L_{i-1} \to L_{i-2} \to R_{i+2} \to R_{i+1}$. Otherwise, $R_{i+1} \to R_{i+2} \to L_{i-2} \to L_{i-1}$ In some example embodiments, it may be determined whether the present beam corresponds to the change point using RSRP of the present beam and RSRP of the previous The statistical bandit model represents possible actions as a set of distributions. The agent and the environment sequentially interact for a fixed number of rounds. For each of t rounds, a user selects an action $A_t$ to be taken, the environment generates a reward $X_t$ from a distribution $P_t$ and feeds the reward $X_t$ back to the user. The interaction between the user and the environment includes a probabilistic measure of a series of results. In other words, in the statistical bandit model, the series of results satisfies assumptions as follows: 1) when $A_1, X_1, A_2, X_2, \ldots, A_{(t-1)}$ and $X_{(t-1)}$ are provided, a conditional distribution of the reward $X_t$ is provided as $P_t$, and the environment is generated from the distribution $P_t$ in a t-th round; and 2) when $A_1, X_1, A_2, X_2, \ldots, A_{(t-1)}$ and $X_{(t-1)}$ are provided, a conditional policy of the action $A_t$ is provided as $\pi_t(\cdot | A_1, X_1, A_2, X_2, \ldots, A_{t-1}, X_{t-1})$, and the user may not use future observations in their current decisions.

The statistical bandit model ultimately aims to maximize $$S_T = \sum_{t=1}^{T} X_t,$$

which is a sum of total rewards.

In some example embodiments, the upper confidence bound algorithm may provide a priority to each beam based on the observed data. The upper confidence bound in the algorithm may represent an operation of overestimating a mean of an unknown reward with a high probability. When it is assumed that a reward $\{X_t\}_{t=1}^T$ is a set of independent sub-Gaussian random variables with a mean $\mu$ and $$\hat{\mu} = 1/T \sum_{t=1}^{T} X_t,$$

Equation 9 may be obtained by Chebyshev's inequality.

$$Pr\left\{\mu \geq \hat{\mu} + \sqrt{\frac{2\log(1/\delta)}{T}}\right\} \leq \delta \text{ for all } \delta \in (0, 1) \quad \text{[Equation 9]}$$

In the training phase, $T_k$ samples may be observed for a k-th arm (e.g., the k-th beam), and a reward with an empirical mean of $\hat{\mu}_k(t-1)$ may be obtained. $\delta$ denotes reliability and represents a degree of certainty.

In the upper confidence bound algorithm, a state between exploration and exploitation may be quantified as an upper confidence bound index. The upper confidence bound index may be represented as a sum of two terms: 1) an empirical mean of the obtained reward; and 2) an uncertainty of the user's knowledge or confidence level. An upper confidence bound index of the k-th beam at time t may be represented as Equation 10.

$$UCB_k(t) = \begin{cases} \infty, & \text{if } T_k(t-1) = 0 \\ \hat{\mu}_k(t-1) + \sqrt{\frac{2\ln(1/\delta)}{T_k(t-1)}}, & \text{if } T_k(t-1) > 0 \end{cases} \quad \text{[Equation 10]}$$

In Equation 10, $UCB_k(t)$ denotes the upper confidence bound index of the k-th beam among the plurality of beams, k denotes an integer greater than or equal to one and less than or equal to K, K denotes a number of the plurality of beams, $\hat{\mu}_k(t-1)$ denotes an empirical mean of a reward of the k-th beam up to (t−1) rounds (e.g., from a first round to a (t−1)-th round), and $T_k(t-1)$ denotes the number of times the k-th beam is selected up to the (t−1) rounds.

In Equation 10, the first term represents the user's knowledge, and the second term is obtained by taking the square root of the reciprocal of the number of times the k-th beam is selected up to the (t−1) rounds and represents a result of the exploration. $\delta$ denotes a parameter that controls or adjusts a ratio of the term representing the exploration. As time goes to infinity, the term representing the exploration may approach zero and the upper confidence bound index may approach the empirical mean. As a result, the upper confidence bound index may converge to the expected reward.

In addition, the empirical mean may be obtained and/or updated based on Equation 11.

$$\hat{\mu}_k(t+1) = \frac{1}{T_k(t+1)} \sum_{t=1}^{T_k(t+1)} X_k(t) \text{ where } T_k(t+1) = T_k(t) + 1 \quad \text{[Equation 11]}$$

In Equation 11, $\hat{\mu}_k(t+1)$ denotes an empirical mean of the k-th beam among the plurality of beams up to (t+1) rounds, k denotes an integer greater than or equal to one and less than or equal to K, K denotes a number of the plurality of beams, $T_k(t+1)$ denotes the number of times the k-th beam is selected up to the (t+1) rounds, and $X_k(t)$ denotes the reward of the k-th beam.

In other words, in step S150, the upper confidence bound index may be defined by Equation 10. In step S250, the candidate beam that maximizes the upper confidence bound index may be selected. In step S160, the empirical mean may be updated based on Equation 11.

The framework of the beam training using the statistical bandit model based on the upper confidence bound algorithm described with reference to FIG. 16 may be represented as Table 4.

TABLE 4

Algorithm: UCB for constructing the training beam set

Output: Estimated optimal beam prior
 1. Calculate UCB index
 2. Select the best beam maximizing UCB index
 3. Perform beam training and measure training beam response 4. Update reward and its empirical mean.

$$\hat{\mu}_k(t+1) = \frac{1}{T_k(t+1)} \sum_{t=1}^{T_k(t+1)} X_k(t)$$

where $T_k(t+1) = T_k(t) + 1$

Figure 17:
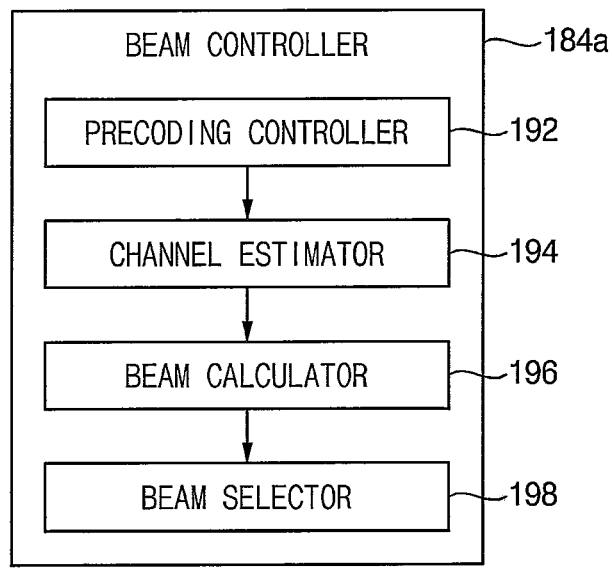
FIGS. 17 and 18 are block diagrams illustrating examples of beam controllers included in a wireless communication device according to some example embodiments.
Figure 18:
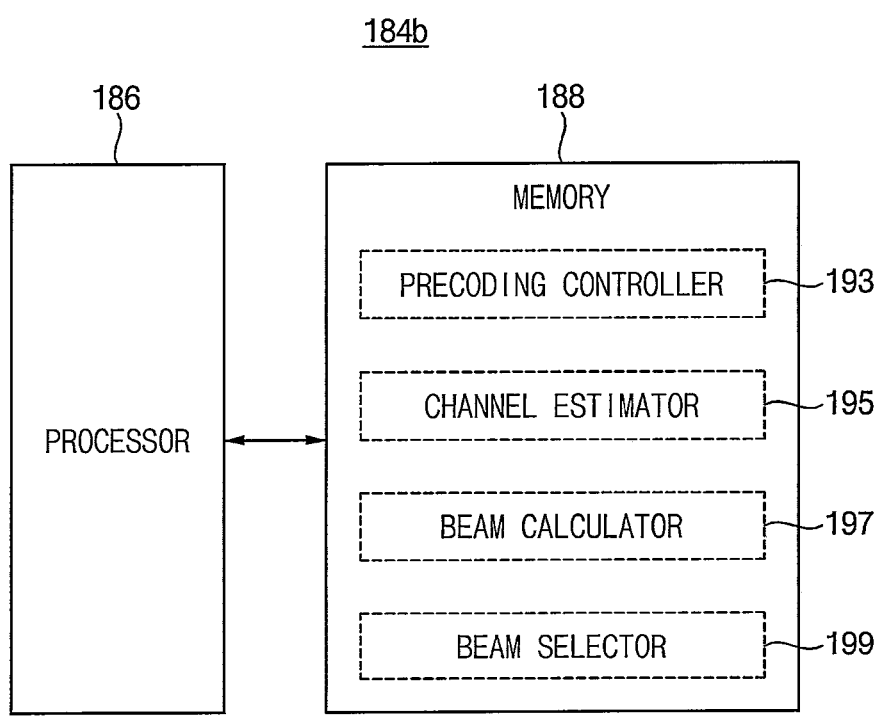

FIGS. 17 and 18 are block diagrams illustrating examples of beam controllers included in a wireless communication device according to some example embodiments. The beam controllers 184a and 184b illustrated in FIGS. 17 and 18 are examples of the beam controller 184 illustrated in FIG. 2.

Referring to FIG. 17, a beam controller 184a may include a precoding controller 192, a channel estimator 194, a beam calculator 196 and a beam selector 198 as logic hardware components designed through logic synthesis.

The precoding controller 192 may generate the control signal CTRL for controlling the precoder 140. In some example embodiments, when the data processor 182 includes the digital precoder, the precoding controller 192 may control the digital precoder. The channel estimator 194 may estimate the channel in the beam training phase. The beam calculator 196 may perform an operation of obtaining at least one of the probability distribution and the value function, an operation of performing the present training operation, or the like, according to some example embodiments. The beam selector 198 may perform an operation of selecting the candidate beam, an operation of selecting the present beam, or the like, according to some example embodiments.

Referring to FIG. 18, a beam controller 184b may include a processor 186 and a memory 188.

The processor 186 may include at least one core, and the memory 188 may include a series of instructions or a program, each executable by the processor 186. For example, the memory 188 may include at least one of a volatile memory and a nonvolatile memory. The memory 188 may include a precoding controller 193, a channel estimator 195, a beam calculator 197 and a beam selector 199 as software modules executed by the processor 186. The processor 186 may access the memory 188 and execute the software modules stored therein to perform operations corresponding to the precoding controller 192, the channel estimator 194, the beam calculator 196 and the beam selector 198 in FIG. 17, respectively, by executing the precoding controller 193, the channel estimator 195, the beam calculator 197 and the beam selector 199.

In some example embodiments, the beam controller 184 in FIG. 2 may be formed by combining logic hardware and a software module. For example, the beam controller 184 may include a precoding controller implemented by logic hardware, and a processor, and a memory including a channel estimator, a beam calculator and a beam selector implemented by software modules.

FIG. 19 is a block diagram illustrating an electronic device in a network environment according to some example embodiments.

Referring to FIG. 19, an electronic device 301 in a network environment 300 may communicate with an electronic device 302 via a first network 398 (e.g., a short-range wireless communication network), or an electronic device 304 or a server 308 via a second network 399 (e.g., a long-range wireless communication network). The electronic device 301 may include a wireless communication device (e.g., the wireless communication device 100 of FIG. 2 including the beam controller 184a of FIG. 17 or the beam controller 184b of FIG. 18) according to some example embodiments. In some example embodiments, the electronic device 301 may communicate with the electronic device 304 via the server 308. In some example embodiments, the electronic device 301 may include a processor 320, memory 330, an input device 350, a sound output device 355, a display device 360, an audio module 370, a sensor module 376, an interface 377, a haptic module 379, a camera module 380, a power management module 388, a battery 389, a communication module 390, a subscriber identification module (SIM) 396, and/or an antenna module 397.

The processor 320 may execute, for example, software (e.g., a program 340) to control at least one other component (e.g., a hardware or software component) of the electronic device 301 coupled with the processor 320, and may perform various data processing or computation. In some example embodiments, the processor 320 may include a main processor 321 (e.g., a central processing unit (CPU) or an application processor (AP)), and an auxiliary processor 323 (e.g., a graphics processing unit (GPU), an image signal processor (ISP), a sensor hub processor, or a communication processor (CP)) that is operable independently from, or in conjunction with, the main processor 321.

The memory 330 may store various data used by at least one component (e.g., the processor 320 or the sensor module 376) of the electronic device 301. The various data may include, for example, software (e.g., the program 340) and input data or output data for a command related thereto. The memory 330 may include a volatile memory 332 or a nonvolatile memory 334. The nonvolatile memory may include an internal memory 336 and the external memory 338.

The program 340 may be stored in the memory 330 as software, and may include, for example, an operating system (OS) 342, middleware 344, and/or an application 346.

The input device 350 may receive a command or data to be used by another component (e.g., the processor 320) of the electronic device 301, from the outside (e.g., a user) of the electronic device 301. The sound output device 355 may output sound signals to the outside of the electronic device 301. The display device 360 may visually provide information to the outside (e.g., a user) of the electronic device 301.

The audio module 370 may convert a sound into an electrical signal and vice versa. The sensor module 376 may detect an operational state (e.g., power or temperature) of the electronic device 301 or an environmental state (e.g., a state of a user) external to the electronic device 301, and then generate an electrical signal or data value corresponding to the detected state. The interface 377 may support one or more specified protocols to be used for the electronic device 301 to be coupled with the external electronic device (e.g., the electronic device 302) directly (e.g., wired) or wirelessly.

A connecting terminal 378 may include a connector via which the electronic device 301 may be physically connected with the external electronic device (e.g., the electronic device 302). The haptic module 379 may convert an electrical signal into a mechanical stimulus (e.g., a vibration or a movement) or electrical stimulus which may be recognized by a user via his tactile sensation or kinesthetic sensation. The camera module 380 may capture a still image or moving images.

The power management module 388 may manage power supplied to the electronic device 301. In some example embodiments, the power management module 388 may be implemented as at least part of, for example, a power management integrated circuit (PMIC). The battery 389 may supply power to at least one component of the electronic device 301.

The communication module 390 may support establishing a direct (e.g., wired) communication channel or a wireless communication channel between the electronic device 301 and the external electronic device (e.g., the electronic device 302, the electronic device 304, or the server 308) and performing communication via the established communication channel. In some example embodiments, the communication module 390 may include a wireless communication module 392 (e.g., a cellular communication module, a short-range wireless communication module, or a global navigation satellite system (GNSS) communication module) or a wired communication module 394 (e.g., a local area network (LAN) communication module or a power line communication (PLC) module).

In some example embodiments, the wireless communication module 392 included in the communication module 390 may include at least a part of the wireless communication device according to some example embodiments, and may be implemented to perform the method of performing beam training according to some example embodiments. For example, each of the wireless communication module 392 included in the electronic device 301 and a wireless communication module (not illustrated) included in the electronic device 304 may include some components (e.g., the precoder 140, the transceiver 160 and the signal processor 180 in FIG. 2) included in the user equipment (e.g., user equipment 100 in FIG. 2) according to some example embodiments, and the second network 399 formed between the electronic devices 301 and 304 may correspond to the channel. The electronic device 301 and the electronic device 304 may perform the wireless communication using the beamforming, and may perform the reinforcement learning-based beam training operation according to some example embodiments.

The antenna module 397 may transmit or receive a signal or power to or from the outside (e.g., the external electronic device) of the electronic device 301. For example, the antenna module 397 may include some components (e.g., the plurality of antennas 120 in FIG. 2) included in the user equipment (e.g., user equipment 100 in FIG. 2) according to some example embodiments.

The inventive concepts may be applied to various communication devices and systems that perform the beamforming and the beam training, and various electronic devices and systems that include the communication devices and systems. For example, the inventive concepts may be applied to systems such as a personal computer (PC), a server computer, a data center, a workstation, a mobile phone, a smart phone, a tablet computer, a laptop computer, a personal digital assistant (PDA), a portable multimedia player (PMP), a digital camera, a portable game console, a music player, a camcorder, a video player, a navigation device, a wearable device, an internet of things (IoT) device, an internet of everything (IoE) device, an e-book reader, a virtual reality (VR) device, an augmented reality (AR) device, a robotic device, a drone, etc.

Various elements disclosed in the present disclosure as black boxes may be functional units, and may be implemented as processing circuitry (e.g., at least one processor) such as hardware including logic circuits or a combination of hardware and software such as a processor executing software. For example, the processing circuitry may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

The foregoing is illustrative of example embodiments and is not to be construed as limiting thereof. Although some example embodiments have been described, those skilled in the art will readily appreciate that many modifications are possible in the example embodiments without materially departing from the novel teachings and advantages of the example embodiments. Accordingly, all such modifications are intended to be included within the scope of example embodiments as defined in the claims. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims.

What is claimed is:

1. A method of performing beam training, the method comprising:

obtaining at least one of a probability distribution and a value function for selecting one of a plurality of beams that are used to perform beamforming;

selecting a candidate beam from among the plurality of beams based on the at least one of the probability distribution and the value function, the candidate beam being expected to be a best beam among the plurality of beams;

performing a present training operation based on the candidate beam and a previous beam selected by at least one previous training operation; and selecting a better one of the candidate beam and the previous beam as a present beam based on a result of the present training operation.

2. The method of claim 1, further comprising:

determining a policy of selecting the candidate beam in the present training operation based on an action of selecting at least one previous candidate beam in the at least one previous training operation and a reward corresponding to a result of the at least one previous training operation.

3. The method of claim 1, further comprising:

determining a policy of selecting the candidate beam using an adversarial bandit model based on an exponential-weight algorithm for exploration and exploitation (EXP3), wherein the selecting selects the candidate beam based on the probability distribution.

4. The method of claim 3, wherein the probability distribution is defined by Equation 1 as follows:

$$p_k(t) = (1-\gamma)\frac{\exp(\rho\hat{S}_k(t))}{\sum_{j=1}^{K}\exp(\rho\hat{S}_j(t))} + \frac{\gamma}{K}, \qquad [\text{Equation 1}]$$

where $p_k(t)$ denotes a probability distribution of a k-th beam among the plurality of beams, k denotes an integer greater than or equal to one and less than or equal to K, K denotes a number of the plurality of beams, $$\hat{S}_k(t) = \sum_{t=1}^{T}\hat{X}_k(t)$$

denotes an estimated value of a cumulative reward of the k-th beam up to t rounds, $\gamma$ denotes a parameter used to adjust a ratio between the exploration and the exploitation, and $\rho>0$ denotes a training rate.

5. The method of claim 3, further comprising:

updating the probability distribution.

6. The method of claim 5, wherein the updating includes:

updating a first reward of the present beam;

updating second rewards of neighboring beams adjacent to the present beam; and updating a cumulative reward based on the updated first reward and the updated second rewards.

7. The method of claim 6, wherein the first reward and the second rewards are obtained based on Equation 2 and Equation 3, respectively, as follows:

$$\hat{X}_k(t) = \begin{cases} \dfrac{\alpha}{p_k(t)} & \text{if } SINR_k \geq \tau \\ \dfrac{-\beta}{1-p_k(t)} & \text{if } SINR_k < \tau \end{cases} \quad \text{[Equation 2]}$$

$$\hat{X}_{k-1}(t) = w_1 \hat{X}_k(t) \text{ and } \hat{X}_{k+1}(t) = w_2 \hat{X}_k(t), \quad \text{[Equation 3]}$$

where in Equation 2, $\hat{X}_k(t)$ denotes the first reward, $p_k(t)$ denotes a probability distribution of the present beam, k denotes an integer greater than or equal to one and less than or equal to K, K denotes a number of the plurality of beams, each of $\alpha>0$ and $\beta>0$ denotes a training rate, $SINR_k$ denotes a signal-to-interference-plus-noise ratio, and ti denotes performance criterion, and in Equation 3, $\hat{X}_{k-1}(t)$ and $\hat{X}_{k+1}(t)$ denote the second rewards, and $w_1$ and $w_2$ denote weights used to update the second rewards.

8. The method of claim 3, further comprising:
determining a training sequence including the at least one previous training operation and the present training operation based on an unequal opportunity scheme in which neighboring beams adjacent to the present beam are preferentially trained.

9. The method of claim 8, wherein, in response to the present beam corresponding to a change point, the determining a training sequence determines the training sequence based on an adaptive unequal opportunity scheme in which explorations are performed first and exploitations are performed after the explorations are completed.

10. The method of claim 9, further comprising:
determining whether the present beam corresponds to the change point based on reference signal received power (RSRP) of the present beam and RSRP of the previous beam.

11. The method of claim 10, wherein the determining whether the present beam corresponds to the change point is performed additionally using RSRP of each of the neighboring beams adjacent to the present beam.

12. The method of claim 1, further comprising:
determining a policy of selecting the candidate beam using a statistical bandit model based on an upper confidence bound (UCB) algorithm; and
the selecting selects the candidate beam based on an upper confidence bound index corresponding to the value function.

13. The method of claim 12, wherein the upper confidence bound index is defined by Equation 4 as follows:

$$UCB_k(t) = \begin{cases} \infty, & \text{if } T_k(t-1) = 0 \\ \hat{\mu}_k(t-1) + \sqrt{\dfrac{2\ln(1/\delta)}{T_k(t-1)}}, & \text{if } T_k(t-1) > 0 \end{cases}, \quad \text{[Equation 4]}$$

where $UCB_k(t)$ denotes an upper confidence bound index of a k-th beam among the plurality of beams, k denotes an integer greater than or equal to one and less than or equal to K, K denotes a number of the plurality of beams, $\hat{\mu}_k(t-1)$ denotes an empirical mean of a reward of the k-th beam up to (t-1) rounds, $T_k(t-1)$ denotes a number of times the k-th beam is selected up to the (t-1) rounds, and $\delta$ denotes a parameter that controls or adjusts a ratio of a term representing exploration.

14. The method of claim 12, further comprising:
updating an empirical mean of the upper confidence bound index.

15. The method of claim 14, wherein the empirical mean is obtained based on Equation 5 as follows:

$$\hat{\mu}_k(t+1) = \dfrac{1}{T_k(t+1)} \sum_{t=1}^{T_k(t+1)} X_k(t) \text{ where } T_k(t+1) = T_k(t) + 1, \quad \text{[Equation 5]}$$

wherein $\hat{\mu}_k(t+1)$ denotes an empirical mean of a k-th beam among the plurality of beams up to (t+1) rounds, k denotes an integer greater than or equal to one and less than or equal to K, K denotes a number of the plurality of beams, $T_k(t+1)$ denotes a number of times the k-th beam is selected up to the (t+1) rounds, and $X_k(t)$ denotes a reward of the k-th beam.

16. The method of claim 1, wherein the performing includes:
receiving a synchronization signal block (SSB) burst based on the previous beam; and
receiving another SSB burst based on the candidate beam.

17. The method of claim 1, wherein the selecting a better one of the candidate beam and the previous beam includes:
in response to a second response characteristic measured based on the candidate beam being higher than a first response characteristic measured based on the previous beam, selecting the candidate beam as the present beam; and
in response to the first response characteristic being higher than or equal to the second response characteristic, selecting the previous beam as the present beam.

18. The method of claim 17, further comprising:
obtaining the first response characteristic and the second response characteristic based on a beamforming gain.

19. A wireless communication device comprising:
a plurality of antenna arrays;
a plurality of radio frequency (RF) chains connected to the plurality of antenna arrays; and
a signal processor configured to process signals received from the plurality of antenna arrays,
wherein the signal processor is configured to cause the wireless communication device to,
obtain at least one of a probability distribution and a value function for selecting one of a plurality of beams that are used to perform beamforming,
select a candidate beam from among the plurality of beams based on the at least one of the probability distribution and the value function, the candidate beam being expected to be a best beam among the plurality of beams,
perform a present training operation based on the candidate beam and a previous beam selected by at least one previous training operation, and
select a better one of the candidate beam and the previous beam as a present beam based on a result of the present training operation.

20. A method of performing beam training, the method comprising:
defining at least one of a probability distribution and a value function for selecting one of a plurality of beams that are used to perform beamforming;
selecting a first candidate beam from among the plurality of beams based on the at least one of the probability distribution and the value function, the first candidate beam being expected to be a first best beam among the plurality of beams in a first training phase;

performing a first training operation in the first training phase based on the first candidate beam and a first present beam;

selecting a second present beam based on a result of the first training operation;

updating the at least one of the probability distribution and the value function based on the result of the first training operation;

selecting a second candidate beam from among the plurality of beams based on the at least one of the updated probability distribution and the updated value function, the second candidate beam being expected to be a second best beam among the plurality of beams in a second training phase subsequent to the first training phase;

performing a second training operation in the second training phase based on the second candidate beam and the second present beam; and selecting a third present beam based on a result of the second training operation; and updating the at least one of the probability distribution and the value function based on the result of the second training operation, wherein a training sequence that represents an order of selecting the first candidate beam and the second candidate beam is not fixed and is adaptively changed.

* * * * *